US011649596B2

(12) United States Patent
Kempken et al.

(10) Patent No.: US 11,649,596 B2
(45) Date of Patent: May 16, 2023

(54) RIDE-ON ROADWAY MAINTENANCE MACHINE

(71) Applicant: G2 Routers, LLC, East Troy, WI (US)

(72) Inventors: Gary Kempken, Rochester, WI (US); Gary Schildt, East Troy, WI (US); Michael Schildt, Eagle, WI (US)

(73) Assignee: G2 Routers, LLC, East Troy, WI (US)

( * ) Notice: Subject to any disclaimer, the term of this patent is extended or adjusted under 35 U.S.C. 154(b) by 0 days.

(21) Appl. No.: 17/162,457

(22) Filed: Jan. 29, 2021

(65) Prior Publication Data
US 2021/0238815 A1 Aug. 5, 2021

Related U.S. Application Data

(60) Provisional application No. 62/968,584, filed on Jan. 31, 2020.

(51) Int. Cl.
*E01C 23/09* (2006.01)
*B62D 1/12* (2006.01)

(52) U.S. Cl.
CPC ........ *E01C 23/0933* (2013.01); *E01C 23/096* (2013.01); *B62D 1/12* (2013.01)

(58) Field of Classification Search
CPC ............ E01C 23/0906; E01C 23/0946; E01C 23/088; E01C 23/09; E01C 23/0933;
(Continued)

(56) References Cited

U.S. PATENT DOCUMENTS

| 3,272,264 A | * | 9/1966 | Antolini ................. E02F 3/345 172/273 |
| 4,668,017 A | * | 5/1987 | Peterson ............. E01C 23/0885 299/109 |

(Continued)

FOREIGN PATENT DOCUMENTS

| DE | 3704851 C1 * | 7/1988 | ......... E01C 23/0933 |
| KR | 10-2011-0096519 | 8/2011 | |

OTHER PUBLICATIONS

English language machine translation of Schmitt, DE-3704851-C1, published Jul. 21, 1988 (4 pages) (Year: 1988).*

*Primary Examiner* — Janine M Kreck
*Assistant Examiner* — Michael A Goodwin
(74) *Attorney, Agent, or Firm* — Boyle Fredrickson S.C.

(57) ABSTRACT

A self-propelled roadway maintenance machine has an operator's station located on a front portion of the machine's chassis and including a forward-facing operator's seat. A driven implement, such as a crack routing cutter drum for routing cracks in a roadway surface, is mounted on the front portion of the chassis in a location that can be monitored by a forward-facing operator while controlling machine steering and propulsion. The implement may be removably mounted on the chassis by a quick-connect coupling. If the implement comprises a crack routing cutter drum, a plurality of peripherally spaced cutter wheel assemblies may be mounted between disks of the cutter drum, each cutter wheel assembly including a pin and first and second bushings that support the pin on the disks and that are removably inserted into respective bores in the disks. Machine steering and propulsion and implement operation may all be effected hydraulically.

18 Claims, 19 Drawing Sheets

(58) Field of Classification Search
CPC .. E01C 23/096; E01C 23/0993; E01C 23/127; E02F 3/3609; E02F 3/3636; E02F 3/3663; B62D 1/12; E01G 23/006; E04G 23/006
USPC .......................... 37/468; 172/272, 273, 274
See application file for complete search history.

(56) References Cited

U.S. PATENT DOCUMENTS

| | | | |
|---|---|---|---|
| 5,709,200 A * | 1/1998 | Mertes | B28D 1/181 |
| | | | 125/13.01 |
| 6,102,022 A | 8/2000 | Schave | |
| 2005/0000122 A1* | 1/2005 | Chagnot | E02F 3/205 |
| | | | 37/352 |
| 2005/0102866 A1 | 5/2005 | Sewell et al. | |
| 2008/0205983 A1* | 8/2008 | Kraemer | E01C 23/088 |
| | | | 404/87 |
| 2011/0280648 A1* | 11/2011 | Malacrino | E02F 9/2271 |
| | | | 403/31 |
| 2012/0068524 A1 | 3/2012 | Hall et al. | |
| 2014/0197673 A1* | 7/2014 | Fanslow | E01C 23/0933 |
| | | | 299/39.3 |
| 2016/0010292 A1* | 1/2016 | Kempken | E01C 23/0933 |
| | | | 299/1.5 |

* cited by examiner

RIDE-ON ROADWAY MAINTENANCE MACHINE

The present application claims priority on U.S. Provisional Patent Application Ser. No. 62/968,584, filed Jan. 31, 2020 and entitled Ride-on Roadway Maintenance Machine, the entirety of which is hereby incorporated herein by reference.

BACKGROUND OF THE INVENTION

Field of the Invention

The invention relates to roadway maintenance machines and, more particularly, relates to a ride-on machine for routing cracks in the surface of a roadway surface or otherwise maintaining a roadway. The invention additionally relates to a method of operating such a machine and to a cutter head or cutter drum usable with such a machine or other machines.

Discussion of the Related Art

Roadways must be routinely maintained. Enumerable maintenance operations include "grazing" or vegetation clearing, cleaning by sweeping or blowing, pothole filling (including cold mix and hot mix asphalt compaction), line painting, etc. As a prime example, crack repair and sealing is a major component of roadway maintenance. Cracks commonly form in roadway surfaces over time, particularly roadways made of asphalt. If left unrepaired, the cracks may widen and deepen, with the process often being exasperated by the infiltration of water and subsequent freezing and thawing. Crack deterioration may eventually lead to the formation of potholes and/or roadway breakup.

Roadway cracks typically are repaired by filling them with an elastic sealant that protects against moisture infiltration. In order to prepare the cracks for filling, loose debris typically is removed from the cracks, and the edges and bottom of the crack are cut away to expose stable surfaces that are not themselves crumbling or cracking. The resulting trench is typically on the order of 0.25" to 2.5" wide to 0.25 to 2.5" deep. This cutting or "routing" allows cracks to be evenly sealed with the elastic sealant material and prevents the sealant from becoming dislodged.

Roadway crack routing typically is performed by a worker-pulled routing machine having a rotating cutting blade assembly that engages the roadway at the location of the crack. One such machine is disclosed in U.S. Pat. No. 6,102,022 to Crafco, Inc., the subject matter of which is hereby incorporated by reference. The worker walks backwards over the crack while pulling the routing machine to rout the crack. These machines suffer from several drawbacks and disadvantages. For example, the routers must be carefully guided along the crack by a worker with sufficient physical strength to control the machine. This control is hindered by the fact that engagement of the rotating blades with the roadway tends to cause the machine to bounce or hop up and down. Any misalignment risks damage to previously-intact roadway surfaces near the crack. In addition, because the router must be physically pulled along a crack by a worker, the effective operating speed of the machine is limited by the worker's physical strength, and may taper off as the worker tires. A tired worker also is more apt to commit router alignment errors.

Attempts have been made in the art to develop roadway crack routers that are less error-prone, such as by providing a routing machine with increased weight so that it is less apt to hop upon engagement of the cutting disk with the roadway. Unfortunately, the additional weight makes the machine more difficult and tiring for an operator to pull. Any benefit gained in precision tends to be lost due to the slower production time.

Traditional roadway routers also are dedicated machines incapable of performing other roadway maintenance operations, such as cleaning or grazing. A contractor or municipality therefore often must have several different machines on hand to fully maintain a roadway, at considerable expense.

The typical roadway router employs a cutter head or drum that rides along the roadway surface. The drum includes a central hub affixed to a driven shaft and a pair of spaced disks. A plurality of peripherally-spaced cutter wheel assemblies are mounted on the disks. Each cutter wheel comprises one or more toothed wheels mounted on a pin extending between the disks so as to freely rotate about an axis that is parallel with but spaced radially from the axis of the driven shaft. The pins are fixed in place using bushings press-fit or otherwise fixed in aligned bores in the disk. These cutter wheel assemblies occasionally must be disassembled for replacement of worn or broken cutter wheels. However, disassembly and reassembly are relatively labor-intensive and time-consuming processes that require the removal of the welded bushings by grinding and punching, if disassembly can be done at all. If not, the only choice is to replace the entire cutter assembly with a new one, at considerable expense.

The need therefore exists to provide a roadway maintenance machine that is self-propelled so as to reduce or eliminate operator fatigue when operating the machine.

The need additionally exists to provide a roadway maintenance machine that that can be precisely maneuvered with minimal operator effort to guide the machine along a desired path.

The need additionally exits to facilitate line of sight operation of a self-propelled roadway maintenance machine.

The need additionally exists to provide a roadway maintenance machine that can be fitted with different implements to perform different maintenance functions.

The need additionally exists to provide a cutter wheel assembly for a router that can be maintained or repaired quickly and easily.

SUMMARY

In accordance with a first aspect of the invention, a roadway maintenance machine is provided that includes a chassis having front and rear portions disposed fore and aft of a lateral centerline of the machine, wheels that support the chassis on the roadway and that include at least one driven wheel and at least one steered wheel (possibly the same wheel), an engine mounted on the chassis, an operator's station mounted on the chassis, and an implement mounting arrangement mounted on the chassis for receiving a driven implement. The implement comprises one of a roadway crack routing cutter drum, a brush, a blower, and a grazer. The operator's station is located at the front portion of the machine to facilitate operator guidance of the machine over a roadway feature, such as a crack, to be acted upon by the machine's implement or tool. The operator's station may include a seat, as well as one or more operator-actuated input device(s) for controlling the machine. The input device(s) may, for example, be one or a combination of foot pedals, levers, joysticks, touchscreens, switches, etc.

The implement mounting arrangement may be configured to permit replacement of a first implement, such as a router, with a second implement, such as a grazer or a brush. A quick-connect coupling may be provided with the implement mounting arrangement to facilitate implement replacement or changeover.

Measures may be incorporated into the machine to control implement operation. For example, in the case of a roadway crack router, an actuator may be controlled in either an open loop or closed loop fashion to maintain a desired cutting depth.

In accordance with another aspect of the invention, a cutter drum assembly is provided for an roadway crack router having individual cutter wheel assemblies that are spaced peripherally around a cutter head or "cutter drum." Each cutter wheel assembly includes a pin that is supported on opposed disks and at least one cutter wheel mounted on the pin. The pin may be supported by first and second bushings that are inserted into aligned sleeves and press-fit into respective aligned bores in the first and second disks. Each bushing may be held in the associated sleeve by a quick mount arrangement that is selectively operable to prevent the bushing from moving axially relative to the sleeve. One such arrangement takes the form of a pin that is threaded into a tapped bore in the disk and that engages a tab or shoulder on the bushing.

In accordance with another aspect of the invention, a method is provided of operating a machine having some or all of the characteristics described above.

These and other aspects, advantages, and features of the invention will become apparent to those skilled in the art from the detailed description and the accompanying drawings. It should be understood, however, that the detailed description and accompanying drawings, while indicating preferred embodiments of the present invention, are given by way of illustration and not of limitation. Many changes and modifications may be made within the scope of the present invention without departing from the spirit thereof. It is hereby disclosed that the invention includes all such modifications.

BRIEF DESCRIPTION OF THE DRAWINGS

Preferred exemplary embodiments of the invention are illustrated in the accompanying drawings in which like reference numerals represent like parts throughout, and in which.

DETAILED DESCRIPTION

Figure 1:
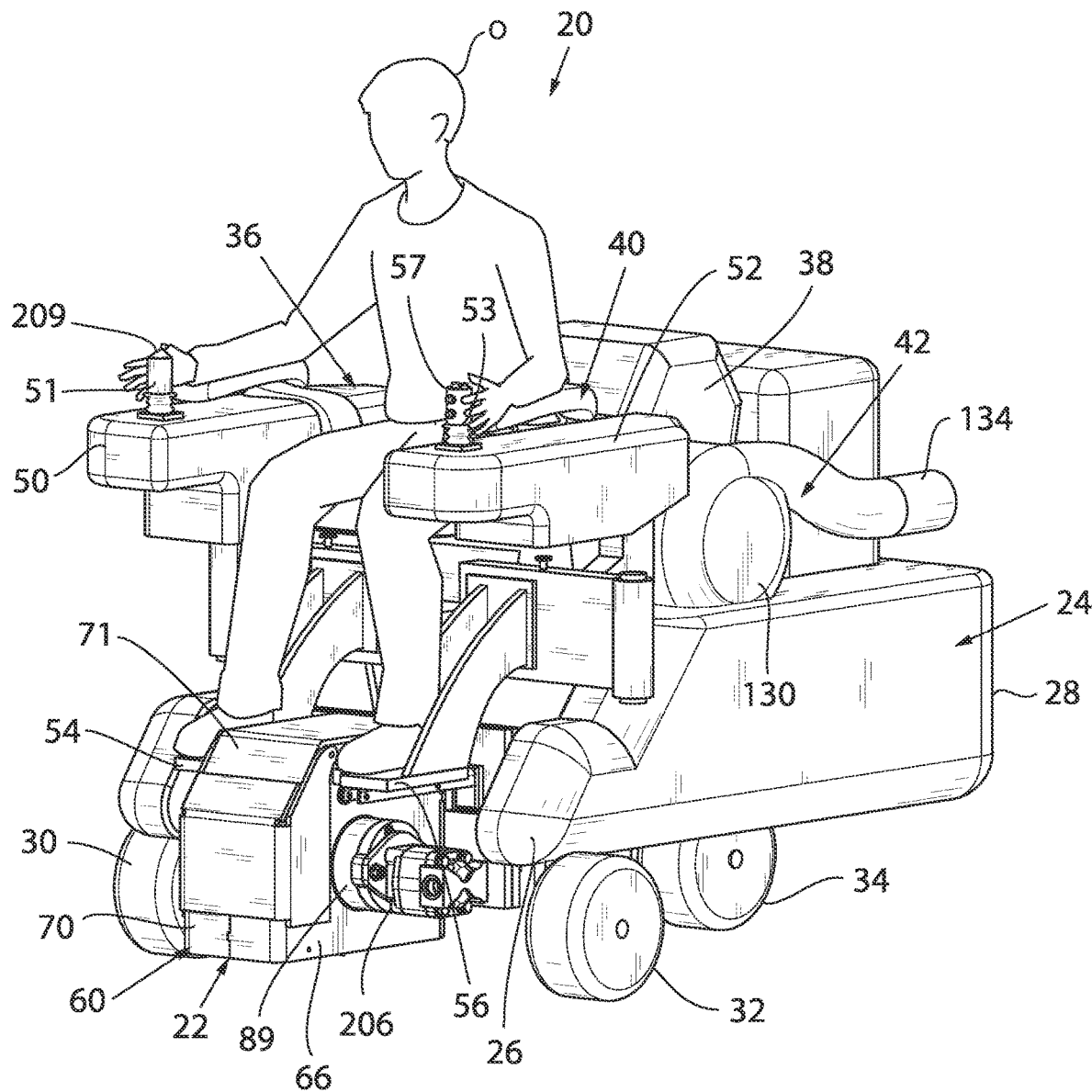
FIG. 1 is a front isometric view of a roadway maintenance machine constructed in accordance with an embodiment of the present invention.
Figure 2:
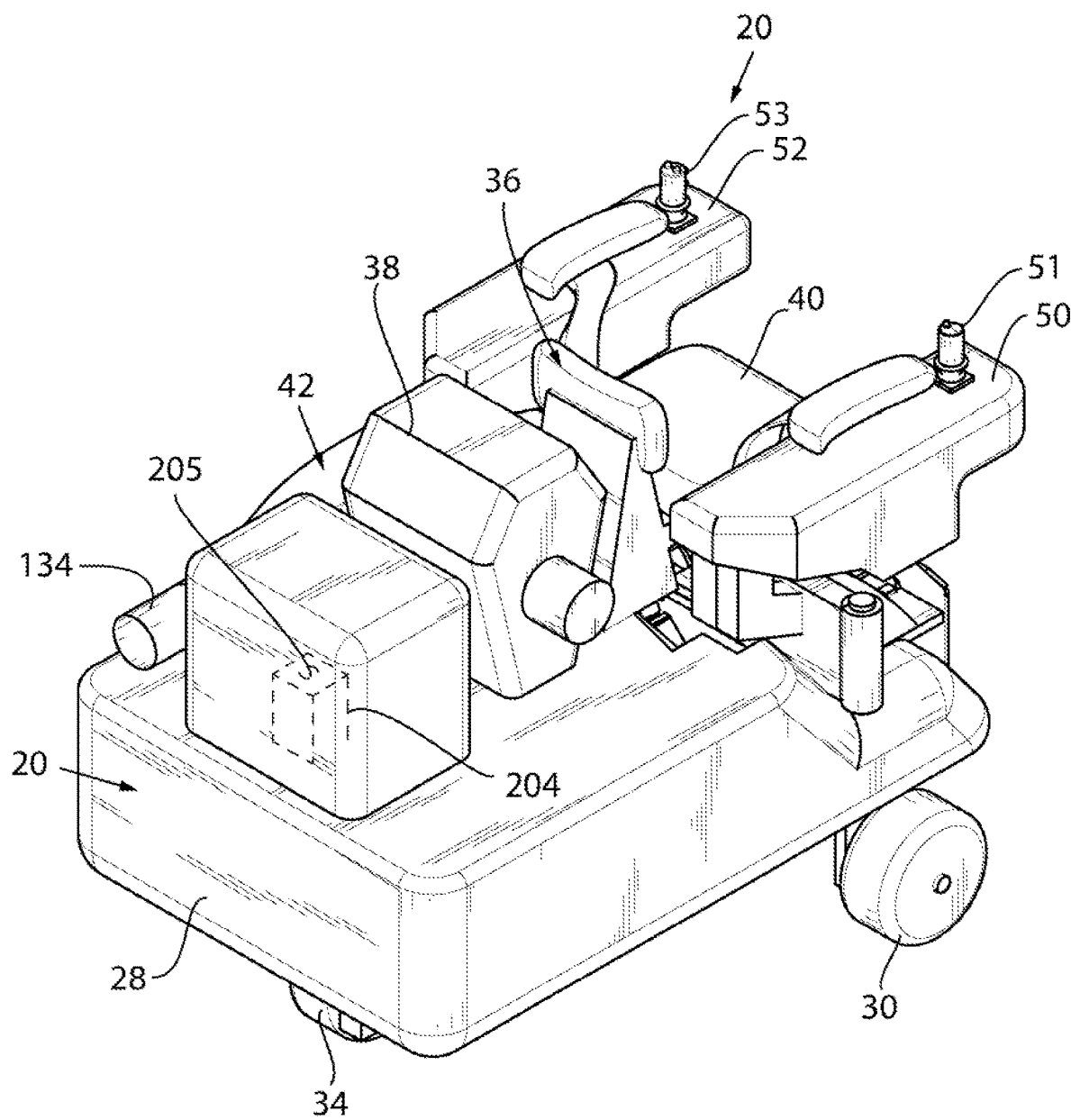
FIG. 2 is rear isometric view of the roadway maintenance machine of FIG. 1.

Referring now to the drawings and initially FIGS. 1-5, a roadway maintenance machine 20 is illustrated in the form of a ride on, self-propelled machine. The machine 20 is adapted to receive a roadway crack routing cutter head, or cutter drum 22, that is configured to rout cracks in the roadway surface for subsequent filling. Machine 20 also may be adapted to receive other implements in place of the cutter drum. The machine 20 includes a chassis 24 having front and rear ends 26, 28, a number of wheels 30, 32, 34 supporting the chassis 24 on the ground, an operator's station 36 supported on the front end 26 of the chassis 24, an engine 38, and a hydraulic drive system that is powered by the engine and that powers all driven components of the machine. The cutter drum 22 or other implement is located at or near the front end 26 of the machine 20 and, in any event, forwardly of the machine's lateral centerline. The operator's station 36 of the machine 20 of this embodiment includes a forward-facing seat 40 whose front end extends over the cutter drum 22 as can be appreciated, for example, from FIGS. 3 and 4. Locating the cutter drum 22 and the operator's station 36 on a front portion of the machine forwardly of the lateral centerline of the machine 20, and orienting the operator's station 36 with a forward facing seat 40, provide a clear line of sight, "LOS" in FIGS. 3 and 4, from the operator "O" to the cutter drum 22 in during a routing operation. Work area inspection also could be monitored by a camera or camera system (not shown) located in the vicinity of the cutter drum 22. The cutter drum 22 can be raised and lowered relative to the chassis 24 and may be connectable to the chassis 24 by a quick connect coupling, such as the coupling 150 of FIGS. 11-15 or the coupling 350 of FIGS. 16-18, that permits quick replacement of the cutter drum 22 with another cutter drum or another implement altogether.

Figure 19:
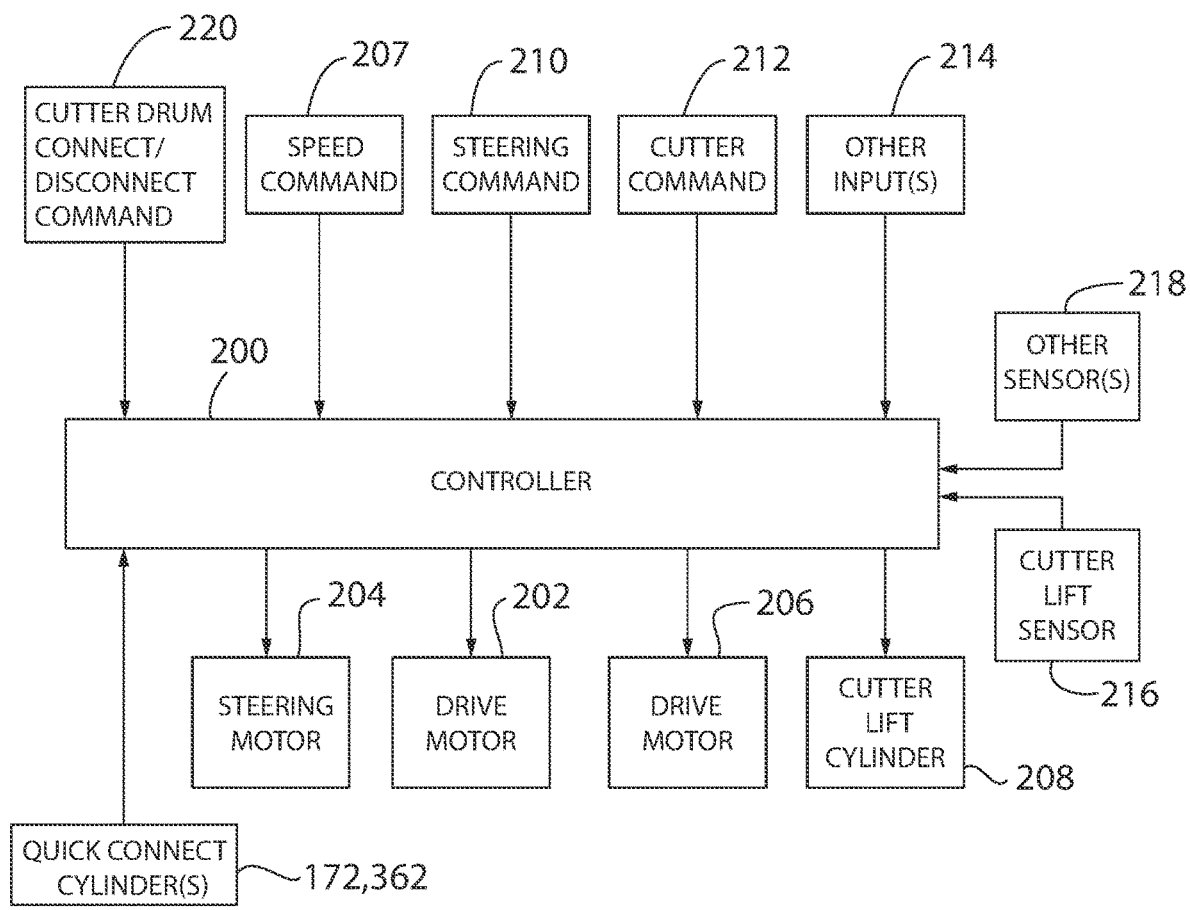
FIG. 19 is control schematic of the roadway maintenance machine of FIGS. 1-5.

Engine 38 may be a diesel or gasoline powered engine, or even an electric or hybrid engine, having a horsepower rating from about 25 hp to about 40 hp. The hydraulic drive includes a hydraulic pump and a reservoir (neither of which is shown) and a plurality of hydraulic motors driven by the pump. Referring briefly to FIG. 19, at least three such motors are provided in this embodiment, one 202 for propelling the driven wheel, another 204 for steering the steered wheel, and still another 206 for driving the cutter assembly 62 to rotate. The pump also supplies pressurized fluid to an actuator, such as the cutter lift cylinder 208 described below, for raising and lowering the cutter head 22 relative to the roadway surface. It also supplies pressurized hydraulic fluid to any other actuator(s) of the machine 20, such as those that operator driven elements of the quick connect coupling 150 or 350 as described below.

Figure 3:
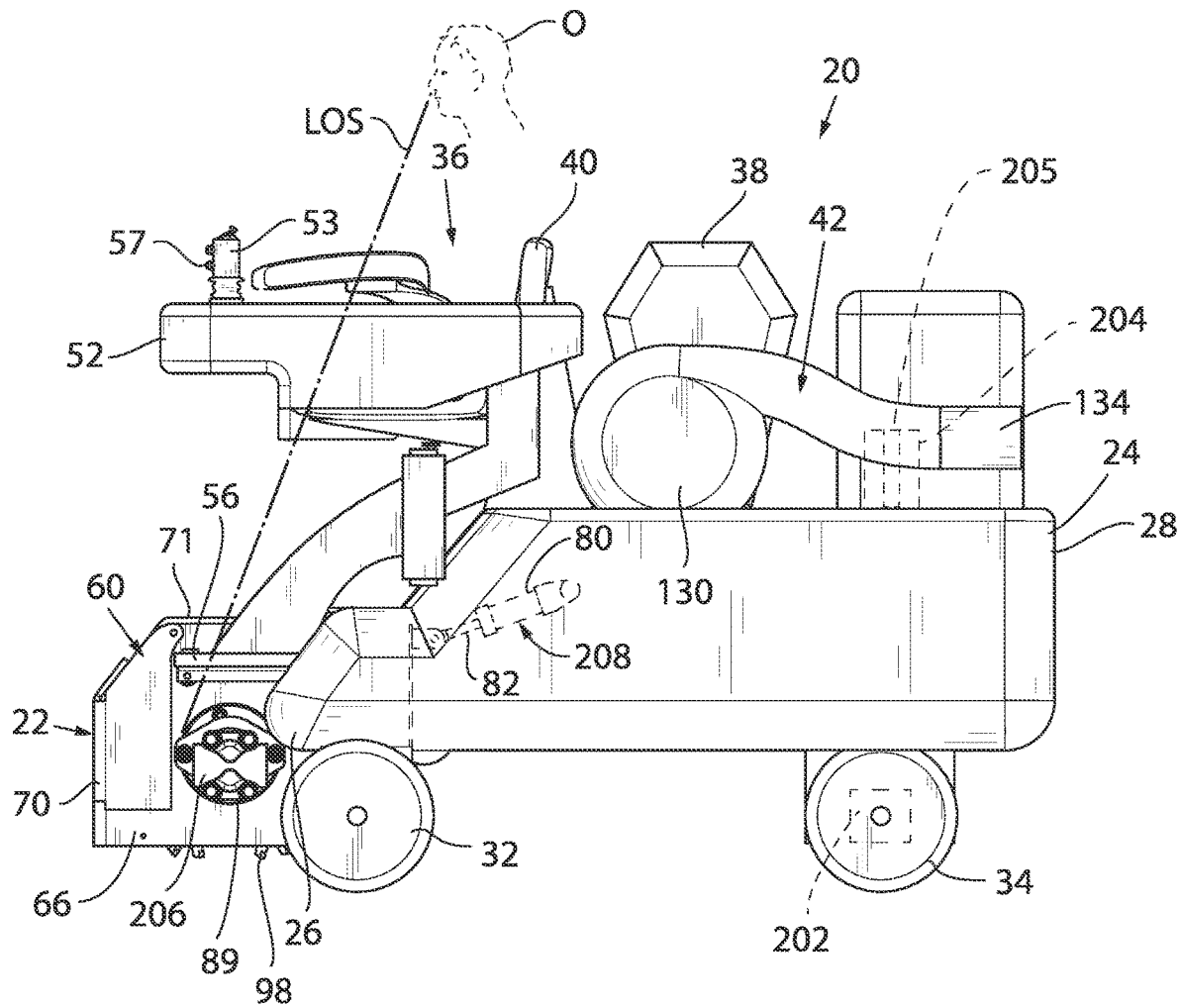
FIG. 3 is left-side view of the roadway maintenance machine of FIGS. 1 and 2.
Figure 4:
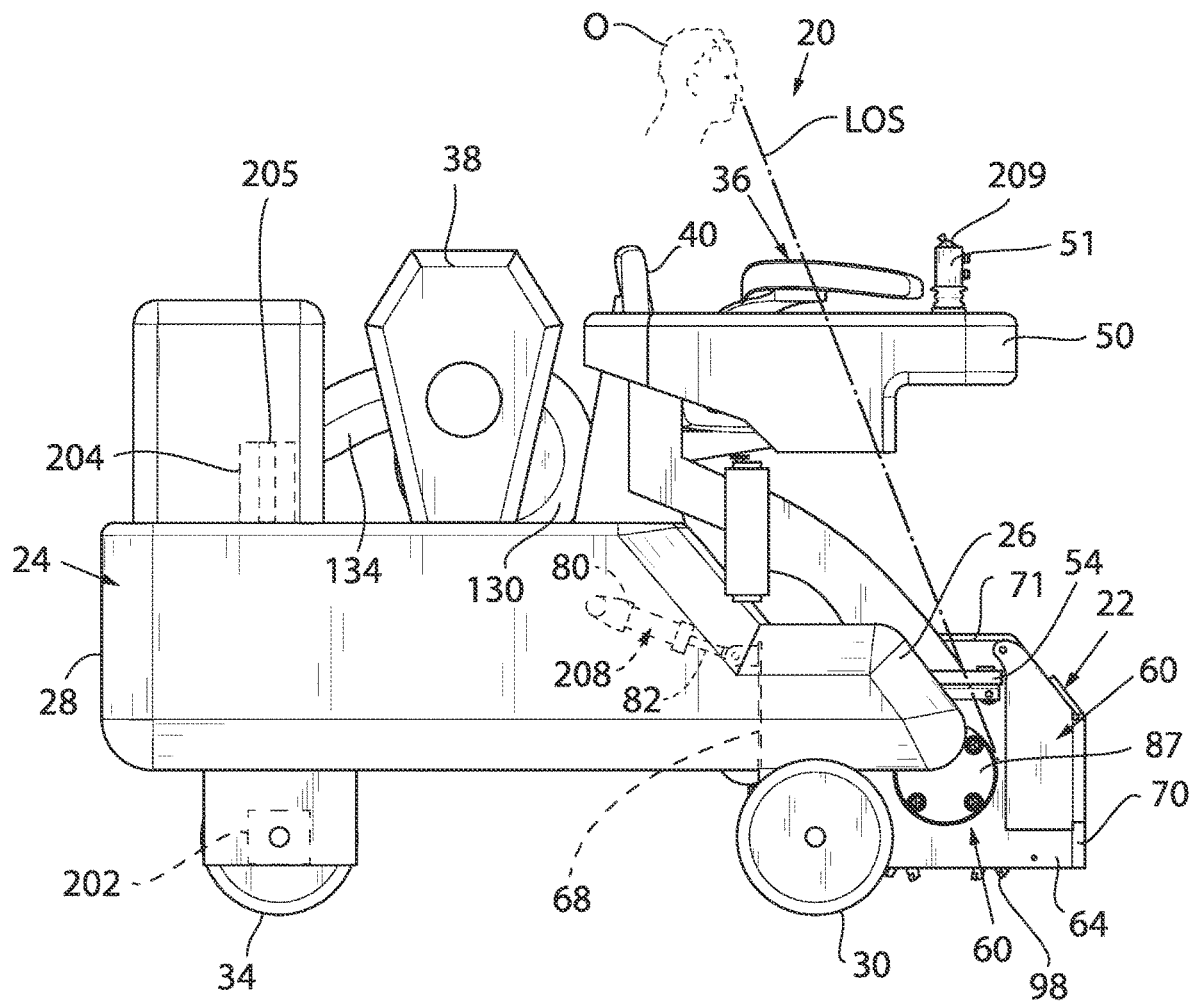
FIG. 4 is right-side view of the roadway maintenance machine of FIGS. 1-3.
Figure 5:
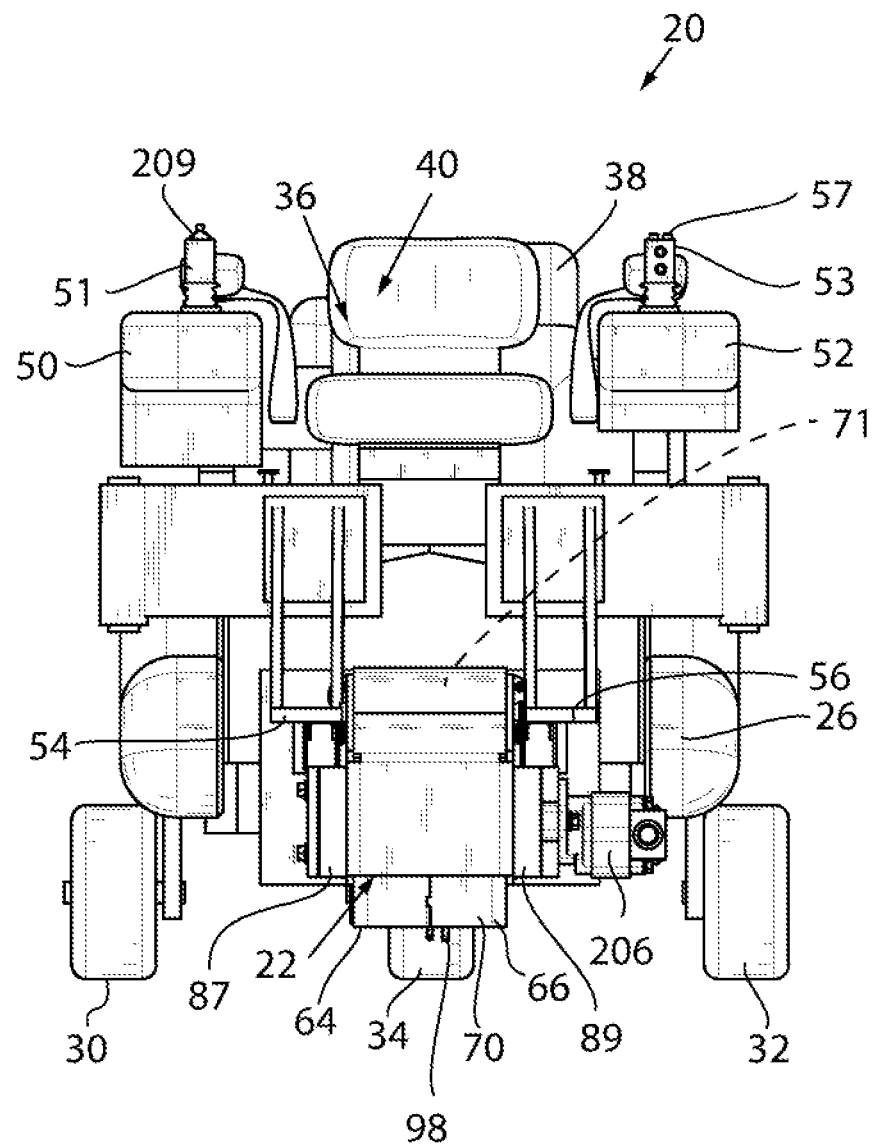
FIG. 5 is a front elevation view of the roadway maintenance machine of FIGS. 1-4.

Referring again to FIGS. 1-5, the wheels include at least one driven wheel which, in the illustrated embodiment, is a rear driven wheel 30 mounted on the lateral centerline of the machine 20. The wheels additionally include a pair of undriven front wheels 32 and 34. FIGS. 1-5 show the front wheels 32 and 34 as extending in parallel with a longitudinal centerline of the machine or, stated another way, as rotating about horizontal axes that extend laterally of the machine. The rear wheel 30 is driven hydraulically by hydraulic motor 202 (FIGS. 3, 4, and 19). It also is capable of swiveling about a vertical or z-axis by the hydraulic steering motor 204 to steer the machine 20 right or left. The hydraulic motor output shaft 205 may be coupled directly to a vertical shaft coupled to a fork on which the rear wheel 30 is rotatably mounted. The range of steering motion provided by the motor 204 may approach or even exceed 90 degrees to either side of longitudinal centerline of the machine 20. While the front wheels 30 and 32 as illustrated are non-driven, they also could be driven hydraulically by the same hydraulic motor driving the front motor or one or two other hydraulic motors. They also could be steered.

Referring especially to FIGS. 1-5, the operator station 36 includes the aforementioned seat 40, right and left supports 50 and 52 located under armrests of the seat 40, and right or left footrests 54 and 56 that flank the implement (in this case, the cutter drum 22). All of these devices are supported on the chassis 24. The supports 50 and 52 may support any of a number of controls and monitors for controlling the machine 20 and monitoring its operation. These operations include fore-and-aft propulsion, side-to-side steering, on/off control of the cutter drum, and possibly other controls such as speed control and cutter drum depth control. Referring briefly to FIG. 19, these controls include a speed (propulsion) command control 207, a steering command control 210, a cutter control 212, and possibly other inputs 214. The controls are manually actuatable to transmit command signals to a controller 200 such as an electronic control unit (ECU). The ECU, in turn, outputs control signals to controlled devices including, but not necessarily limited to, hydraulic drive motor 202, hydraulic steering motor 204, cutter drive motor 206, and an actuator for raising and lowering the cutter drum 22 relative to the roadway surface. Such an actuator could take the form of a screw drive or a gear drive. In the present example, the actuator takes the form of a cylinder 208. Control of one or more of these devices, such as the cutter lift cylinder 208, may be based in whole or in part on signals from sensors.

In one configuration, propulsion and steering may be controlled by joysticks, and some or all of the remaining operations of the machine 20 may be controlled by a touchscreen and/or by switches located adjacent the touchscreen and/or on the joysticks. For example, fore-and-aft propulsion may be controlled by a joystick 51 that is mounted on one of the supports 50 or 52 and that moves along a fore-and-aft or y-axis, and side-to-side steering may be controlled by another joystick 53 that is located on the other support 50 or 52 and that moves from side-to-side or about an x-axis. Both of these joysticks may provide proportional control such that the speed of the vehicle may be varied under feedback from 0 to a maximum based on the stroke of joystick 51 from neutral and the steering angle may be varied under feedback from 0 to a maximum based on the stroke of joystick 53 from neutral. Alternatively, a single two-axis joystick could be used to control both propulsion and steering. In either event, system response may be proportional to joystick stroke so that maximum propulsion speed is achieved at maximum fore-or-aft joystick motion and maximum steering angle is performed at maximum left or right joystick motion.

Other controls may be mounted on the joysticks as well. For example, a switch 209 could be provided on the joystick 51 for actuating the cylinder 208 to raise and lower the cutter drum 22 between its working and transport positions. Lowering the cutter drum 22 may also automatically trigger operation of the motor 206 to drive the cutter assembly 62 of the cutter drum 22 to rotate. As another example, one or more buttons 57 may be provided on the joystick 53 to engage or disengage a quick connect coupling as described in further detail below.

In one possible configuration, operation of other aspects of the machine 20, such as cutter drum depth and possibly rotational speed, and other controlled aspects of the machine 20 are controlled by a touchscreen (not shown) that is located within easy reach of the operator. The touchscreen may additionally include functionality that permits monitoring of the operation of the machine 20 including aspects such as travel speed, cutter drum depth, cutter drum RPM, etc.

Referring now to FIGS. 1-10, and initially to FIGS. 1-3, 9, and 10, the cutter drum 22 is mounted on the machine 20 forwardly of the chassis 24 and centrally of the machine. It includes a frame assembly or cutter housing 60 defining a center opening, and a cutter assembly 62 supported on the cutter housing 60 within the center opening. As clearly shown in the drawings, the cutter assembly 62 extends in parallel with the front wheels 32 and 34 and with a longitudinal centerline of the machine and rotates about a horizontal axis extending laterally of the machine. The cutter housing 60 may be mounted on the chassis 24 either directly or by a quick connect coupling as described below in conjunction with FIGS. 11-14. The cutter housing 60 includes right and left side plates 64, 66, a rear cross plate 68 connected to the rear ends of the side plates 64 and 66, and a front cross plate 70 connected to the front ends of the plates 64 and 66. A cover 71 overlies the cutter assembly 62. The rear plate 68 may have has an opening formed in it for receiving an inlet tube (not shown) of the dust handling system 42.

Figure 6:
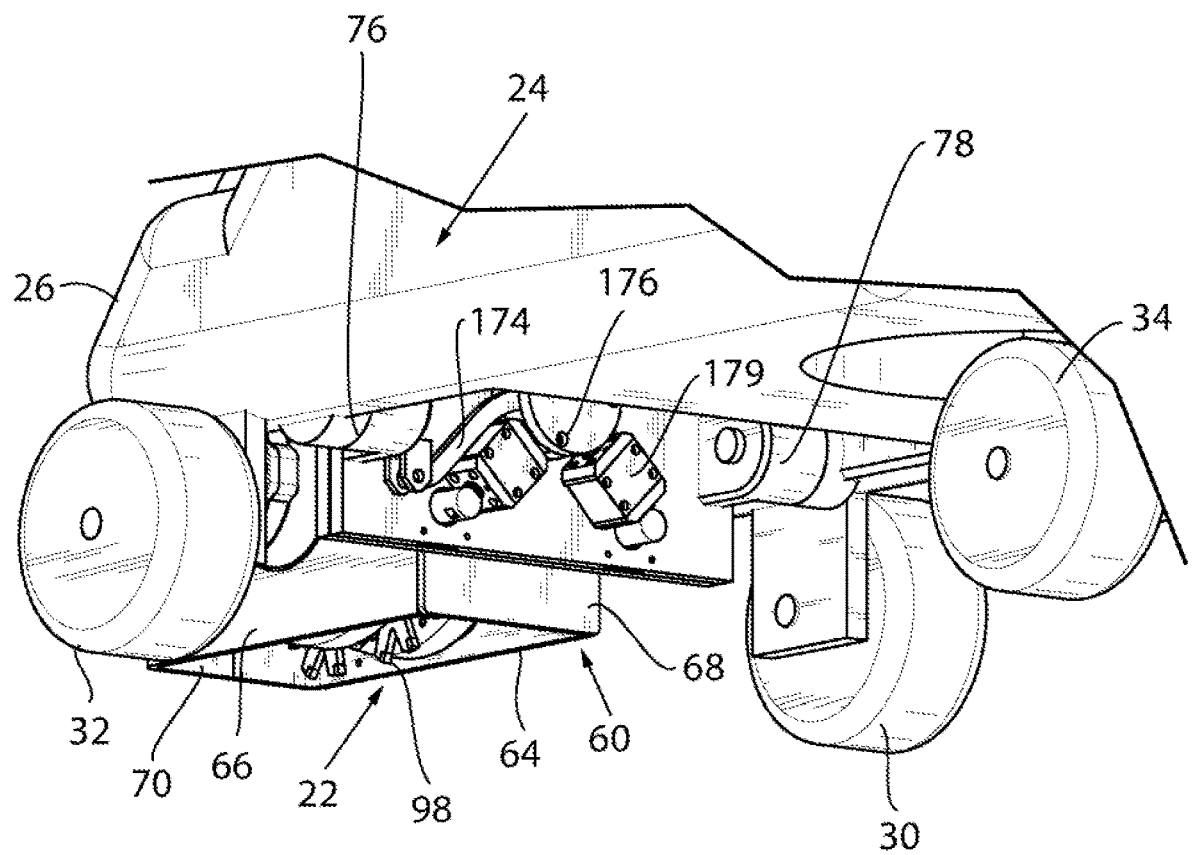
FIG. 6 is a fragmentary bottom isometric view of a portion of the roadway maintenance machine of FIGS. 1-5.
Figure 7:
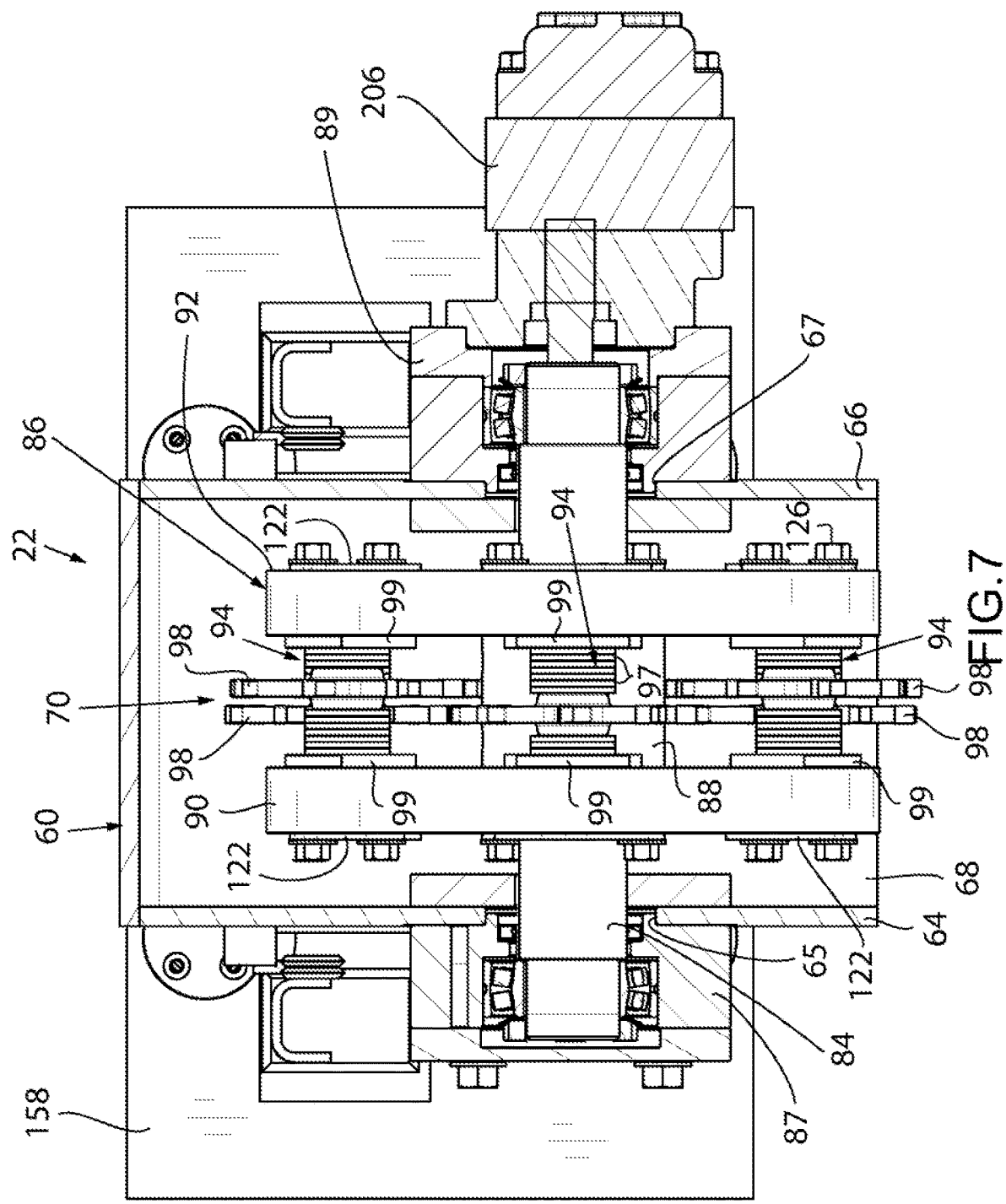
FIG. 7 is a sectional front elevation view of a roadway crack routing cutter head or "cutter drum" of the roadway maintenance machine of FIGS. 1-5.

Referring especially to FIG. 6, the cutter housing 60 and thus the cutter drum 22 as a whole are pivotably mounted to the chassis 24 by right and left pivot links 72 and 74, each having a rear end (not shown) connected to a subframe on the chassis 24 and a front end in the form of a boss 76, 78. Each boss 76, 78 may either be connected to the support frame or, in the present case in which a quick connect coupling is provided, to the main support plate 152 or 352 of the quick connect coupling 150 or 350. The cutter housing 60 can be driven to pivot about the links 72 and 74 by the cutter lift cylinder 208. As best seen in FIGS. 3 and 4, cylinder 208 has a barrel end 80 that is mounted on the chassis 24 and a rod end 82 that is connected to a support plate 152 of the quick connect coupling 150 or to the support plate 352 of the quick-connect coupling 350 via a bracket 83. Lift cylinder 280 is a double acting hydraulic cylinder 208 that is locked in a given position in the absence of hydraulic fluid flow into and out of the cylinder. The cylinder 208 thus remains in in given position upon being actuated a particular amount unless it is again actuated to increase or decrease piston stroke. This negates the need to continuously pressurize the cylinder 208 with attendant risk of leaks and also reduces the system pressure necessary to operate the machine as a whole Referring especially to FIGS. 7-9, the cutter assembly 62 includes a driven shaft 84 and a rotating drum 86 mounted centrally on the shaft 84 so as to rotate with the shaft. The shaft 84 extends through aligned openings 65 and 67 in the side plates 64 and 66 and is supported in bearing assemblies 87 and 89 mounted on the side plates 64 and 66. It is driven by the hydraulic motor 206, which may be mounted on one of the bearing assemblies 89 in alignment with the driven shaft 84 as best seen in FIG. 6. The drum 86 includes a central hub 88 affixed to the shaft 84 and a pair of spaced disks 90, 92. The disks 90, 92 may have a diameter of 6" to 36" and, more typically, of about 12" to 24". A plurality of peripherally-spaced cutter wheel assemblies 94 (only one of which is shown) are mounted on the disks 90, 92. Six equally spaced cutter wheel assemblies 94 are provided in this embodiment.

Figure 10:
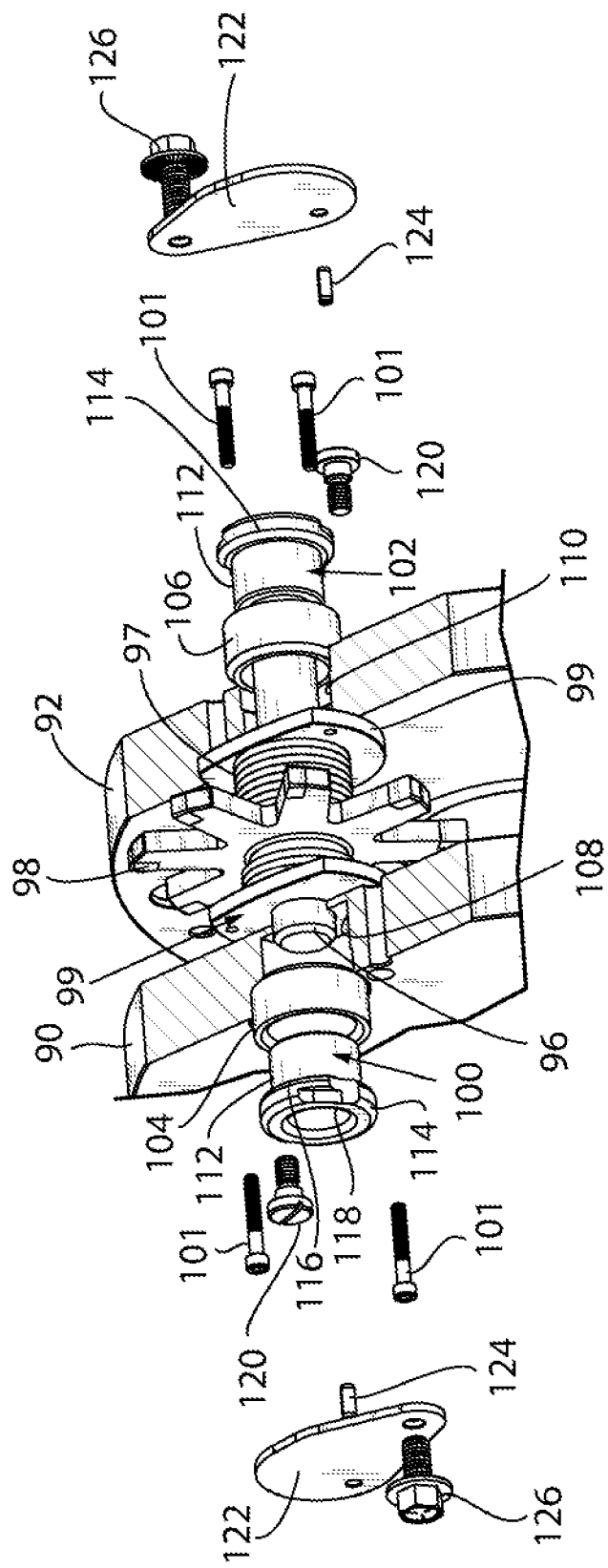
FIG. 10 is an exploded isometric review of a cutter wheel assembly of the cutter assembly of FIGS. 8 and 9.

Referring especially to FIG. 10, each cutter wheel assembly 94 is mounted on a pin 96 extending between the disks 90, 92 so as to rotate about an axis that is parallel with but spaced radially from the axis of the driven shaft 84 so that the cutter wheel assembly 94 revolves around the shaft upon rotation of shaft 84. The cutter wheel 98 of each cutter wheel assembly 94 freewheels or rotates passively about the associated pin 96 during rotation of the drum 86 about the shaft 84. Although only a single cutter wheel 98 is illustrated in FIG. 10, more than one could be employed in each cutter wheel assembly 94, if desired. The cutter wheels 98 of the various assemblies 94 also can be staggered axially of the drum 86 relative to one another on their respective pins 96 to increase the effective width of the trench cut by the cutter assembly 62. That effective width may be, for example, 2". Staggering may be achieved by inserting spacers 97 on the pin 96 on one or both sides of the cutter wheel 98, with the number and locations of spacers varying between cutter wheel assemblies 94. In order to reduce wear on the disks 90, 92 cutter wheel due to contact with an adjacent spacer 97 or cutter wheel 98, a sacrificial washer 99, made of hardened steel, may be bolted onto or otherwise attached to the inside surface of each of the disks 90, 92 to act as a buffer between the disk 90, 92 and an adjacent component in the form of either a spacer 97 or a cutter wheel 98. The sacrificial washer 99 is attached to the disk 90 or 92 by a pair of bolts passing through associated through-bores in the disk 90 or 92 and into a tapped bore in the sacrificial washer 99.

Referring now to FIGS. 7-10, the support pin 96 for each cutter wheel assembly 94 is mounted on the disks 90 and 92 via a quick mount connection that facilitates changeover of cutter wheels 98 of one configuration (such as the number of wheels and/or diameter or thickness of each wheel), and/or rapid replacement of worn or broken cutter wheels 98 or related components, such as the pins 96. Each quick mount arrangement includes the support pin 96 and first and second bushings 100 and 102 that are inserted into aligned sleeves 104 and 106 press-fit into respective aligned bores 108 and 110 in the first and second disks 90 and 92. The bushings 100 and 102 and the devices with which they interact are mirror images of each other.

Figure 8:
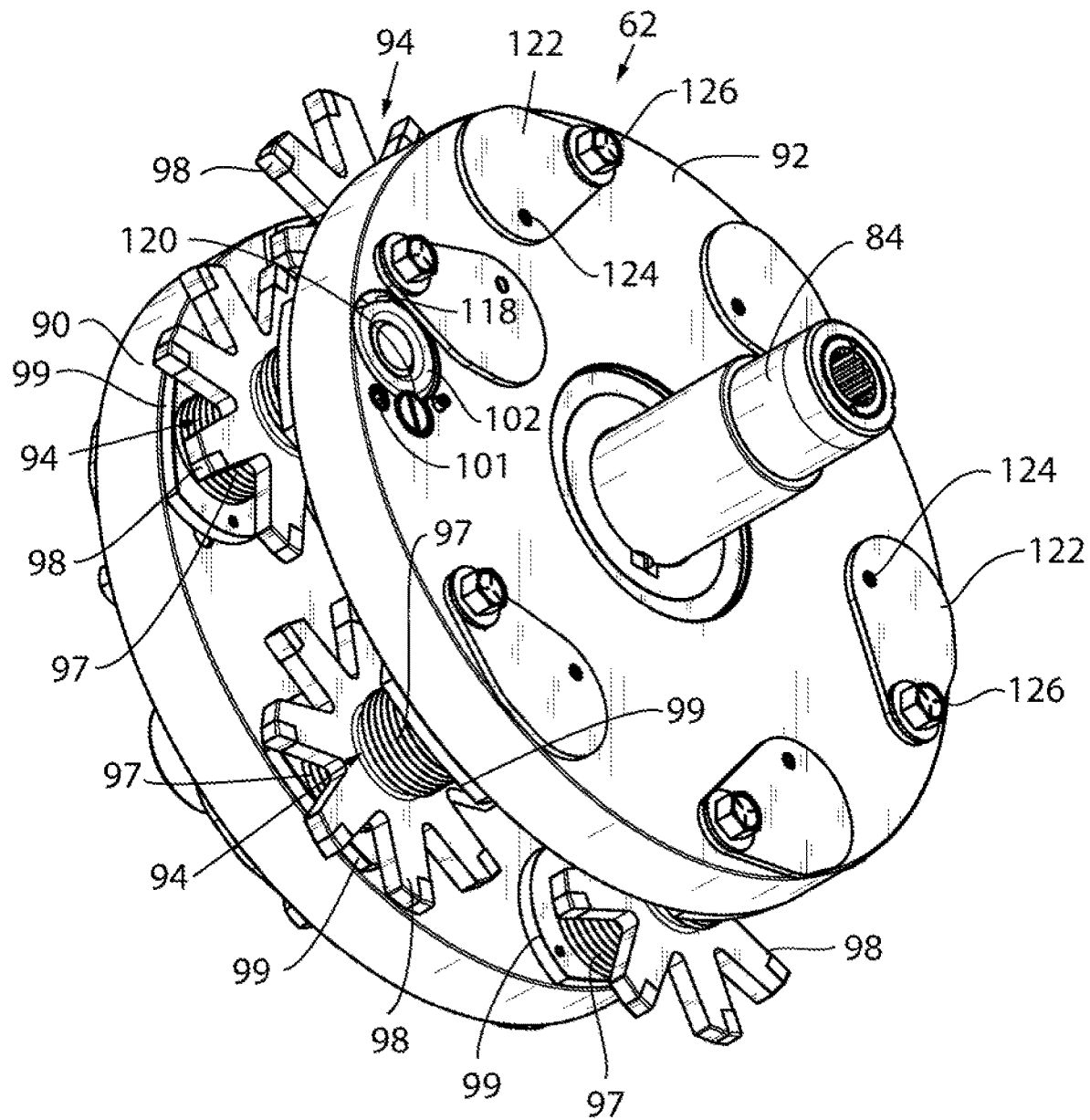
FIG. 8 is an isometric view of a cutter assembly of the cutter drum of FIG. 7.

As best seen in FIGS. 8 and 10, each bushing 100 or 102 includes an inner end 112 of reduced diameter and an outer end 114 of a larger diameter. The inner end 112 is received in the associated sleeve 104 or 106. The larger diameter outer end 114 fits within the bore 108 or 110 and seats against the outer axial end of the sleeve 104 or 106. Referring to FIGS. 8 and 10, the outer periphery of the outer end 114 is notched with a semi-cylindrical through-notch 116, and a ledge or tab 118 is positioned adjacent the through-notch 116. A threaded bore in the disk 90 or 92 is aligned with the center of the virtual cylinder that is partially-defined by the through-notch 116 for receiving a retainer which, in the illustrated embodiment, is a retaining screw 120. When the bushing 100 or 102 is seated in the bore 108 or 110 and the sleeve 104 or 106, the retaining screw 120 can be threaded into the threaded bore to a position in which the head of the screw clamps 120 against the tab 118, preventing outward axial movement of the bushing 100 or 102 from the bore 108 or 110. The bushing, pin, and screw may be protected from dirt and debris by a cover 122. The cover 122 can be retained in its engaged position by a bolt 126 that extends through a through-bore in the cover 122 and into a tapped bore in the disk 90 or 92. The cover 122 swivels about the bolt 126 from an engaged position in which it overlies the pin 96 and bushing 100 or 102 to a disengaged position exposing the pin 96 and bushing 100 or 102. The cover 122 is retained from unintentionally swinging away from its engaged position under centrifugal forces by a pin 124 received in a bore in the disk 90 or 92. Note that one such cover is shown in FIG. 8 as being swung out of its engaged or overlying relationship with the pin and bushing. The cover 122 also prevents axial movement of the pin 96 relative to the bushing 100 or 102 when the cover 122 is in its engaged position overlying the pin 96 and bushing 100 or 102.

To assemble the cutter assembly 94, each of the removable bushings 100, 102 is inserted into the associated sleeve 104 and 106 and locked in place using the retaining screw 120. The support pin 96 then is inserted through one of the bushings 100 and into the space between the disks 90 and 92. The cutter wheel 98 is then mounted on the inner end of the pin 96, and the pin 96 is fully inserted into the other bushing. The pin 96 is sized relative to the bushings 100 and 102 to provide a slip fit between the two. The covers 122 are then swung into place to protect the ends of pin 96 and the bushings 100 and 102 and to inhibit axial movement of the pin 96 relative to the bushings 104 and 106.

Referring now to FIGS. 1-5, a dust handling system 42 is designed to receive dust and debris that are dislodged from the roadway surface during a routing operation and to blow that debris to the rear end of the machine 20. There, the dust either may be collected in bags or otherwise handled. The dust handling system 42 includes a blower 130, an inlet tube or duct arrangement (not shown) connected to an inlet of the blower 130, and outlet tube or duct arrangement 134 connected to the outlet of the blower 130. The blower 130 may be a centrifugal blower driven directly or indirectly by an output shaft of the engine 38.

Figure 9:
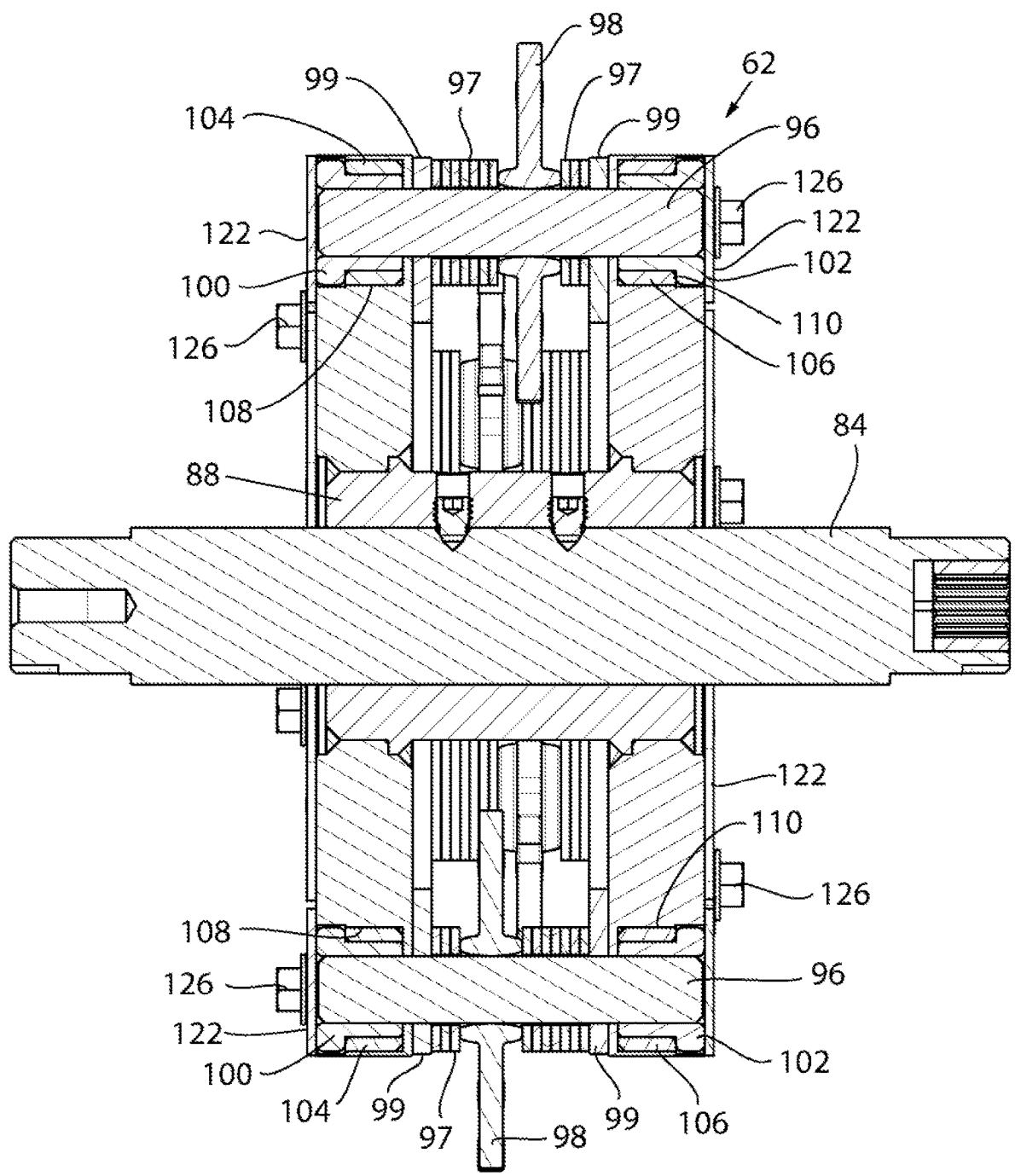
FIG. 9 is a sectional elevation view of the cutter assembly of FIG. 8.

The cutter assembly 62 could be used with little or no modification in other routing machines, simply by mounting the cutter assembly 62 as shown in FIGS. 8-10 on the cutter drum of the router. For example, the cutter assembly 62 could be mounted essentially unmodified on a Crafco Model 30 router, which is a manually-pulled router of the type mentioned in the Background section above, except for the fact that the hub 88 and disks 90, 92 would be mounted on the router's existing drive shaft rather than the illustrated shaft 84. It could similarly be used with the router disclosed in the Crafco '622 patent discussed above. In this case, the drive shaft could be driven by the router's existing chain or belt drive rather than by a hydraulic motor.

The cutter drum 22 may be mounted on the chassis 24 by a quick connect coupling that permits rapid attachment of the cutter drum 22 to the chassis 24, rapid replacement of the cutter drum 22 with another cutter drum of a different configuration, or rapid replacement of the cutter drum 22 with a different implement entirely, such as a grazer, a blower, or a brush. One possible embodiment of the quick connect coupling 150 is illustrated schematically in FIGS. 11-14. The illustrated quick connect coupling 150 is characterized by a rear support plate 152 and a number (four in this embodiment) support pins 154 that are mounted on the rear support plate of the cutter drum and that selectively engage corresponding holes 162 in the support plate 152. A cutter wheel support plate 158 is welded or otherwise affixed to the rear surface of the rear plate 68 of the cutter housing assembly 60. The mounting pins 154 extend rearwardly from the rear surface of the plate 158.

Figure 11:
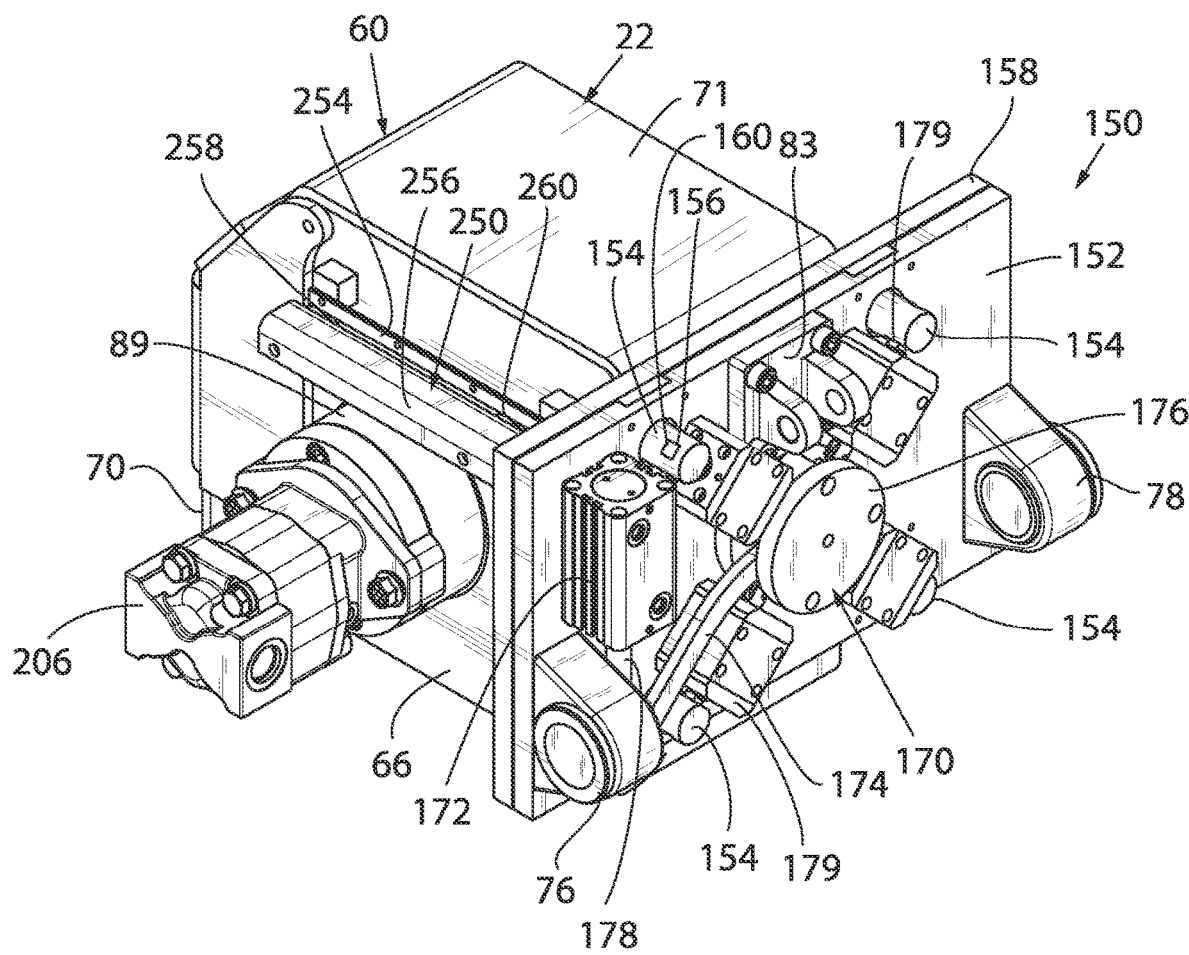
FIG. 11 is an isometric view of a quick connect coupling of the roadway maintenance machine of FIGS. 1-5, showing the coupling in its fully-engaged position.
Figure 12:
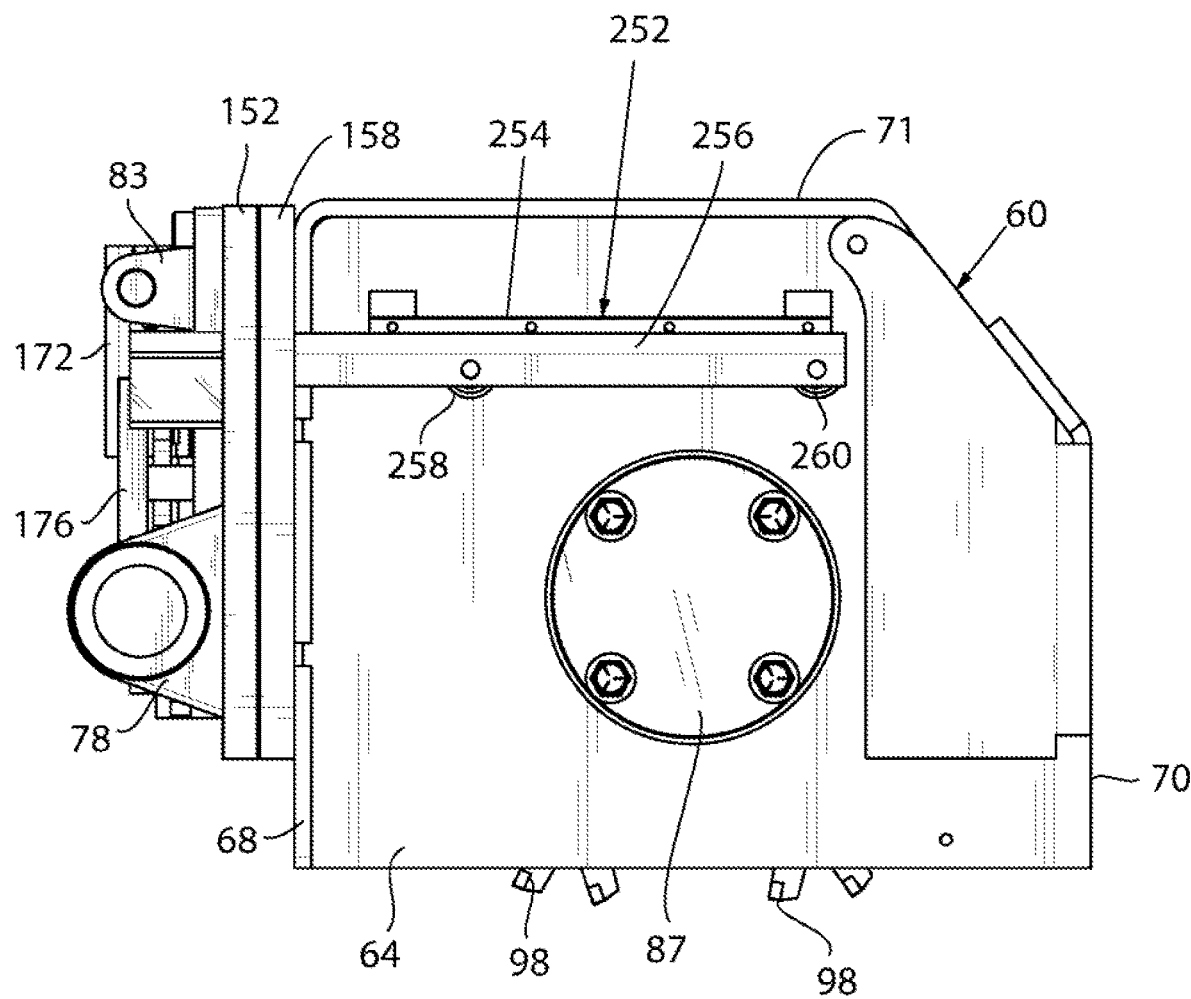
FIG. 12 is a side elevation view of the quick connect coupling of FIG. 11.
Figure 13:
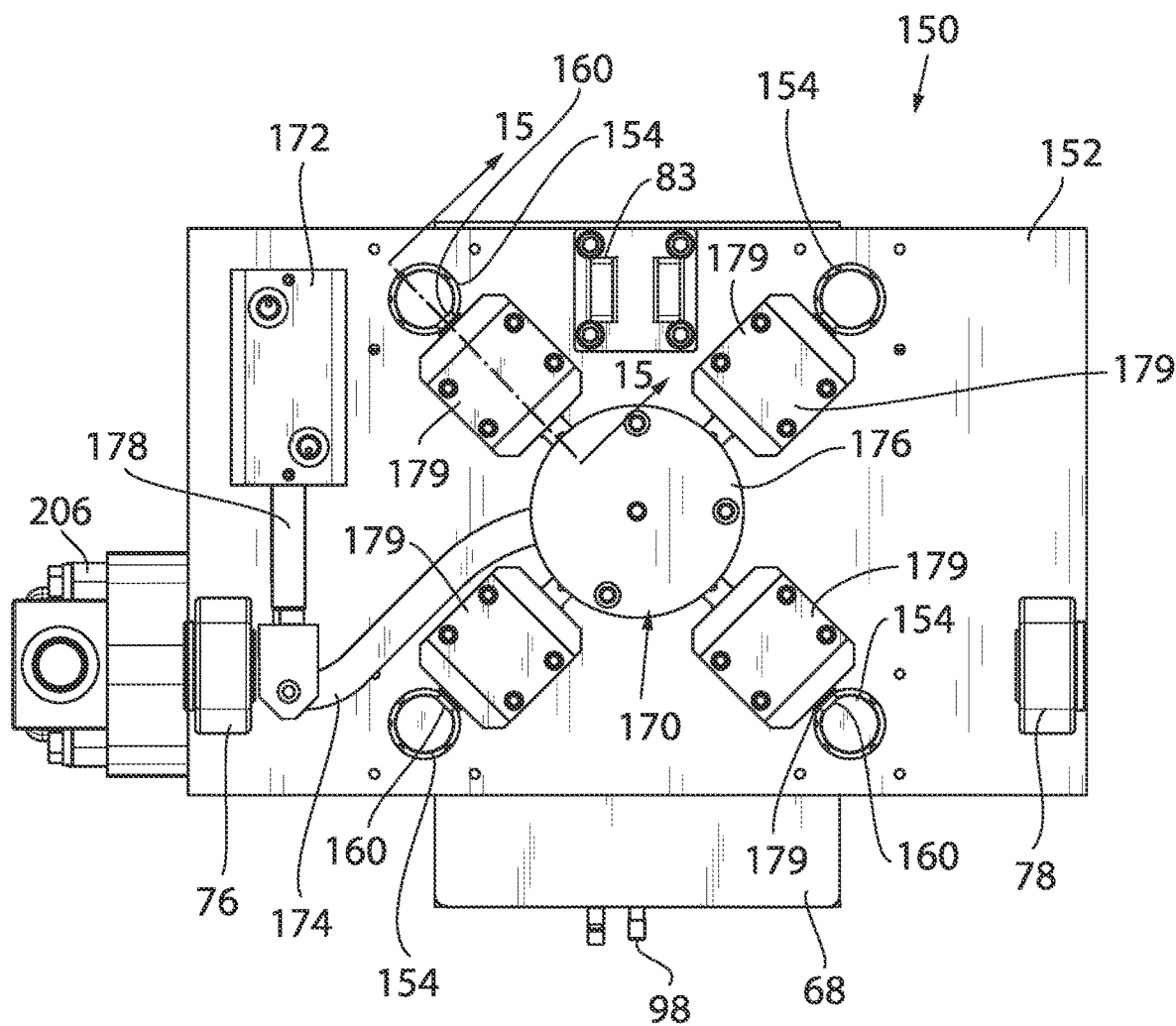
FIG. 13 is a rear elevation view of the quick connect coupling of FIGS. 11 and 12.
Figure 15:
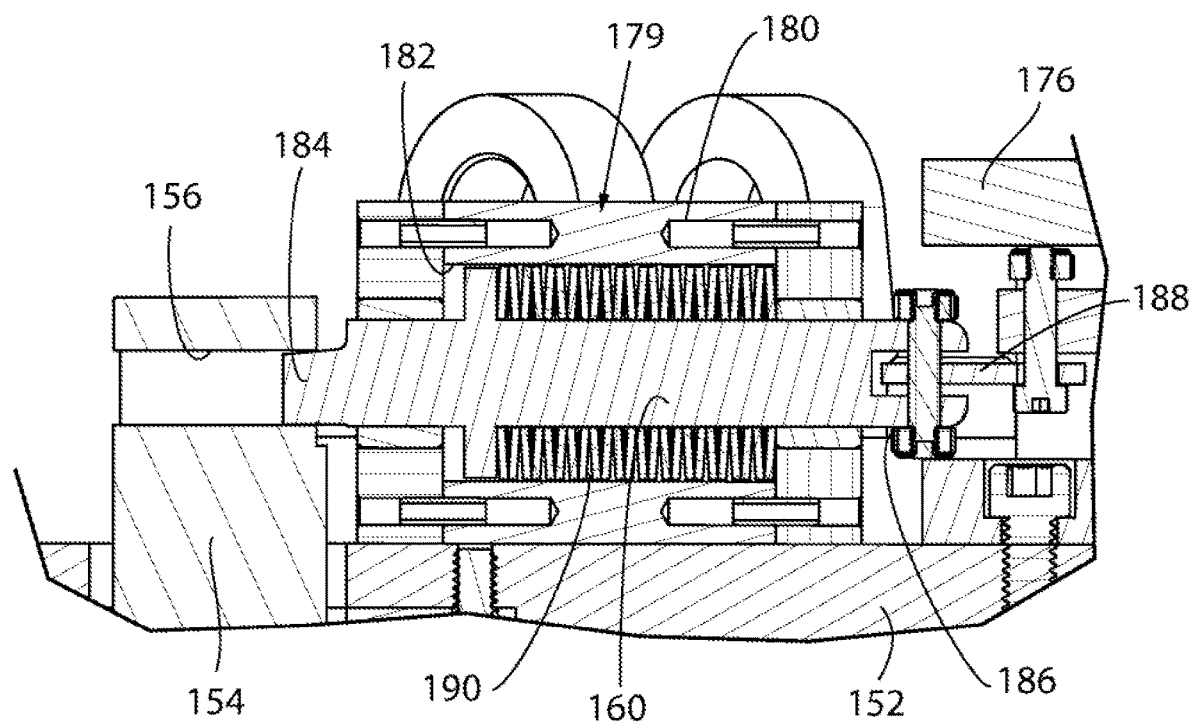
FIG. 15 is a sectional elevation view a locking pin actuator of the quick connect coupling of FIGS. 11-14.

Referring to FIGS. 11 and 13, when the quick connect coupling is engaged, the plates 152 and 158 are locked from moving relative to one another by the engagement of locking pins 160 with bores 156 in the mounting pins 154. The locking pins 160 can be driven into and out of engagement with the bores 162 by an actuator 170. In the illustrated embodiment, the actuator comprises a linear actuator in the form of a double acting hydraulic cylinder 172 and a crank assembly having an actuator arm 174 and a rotatable drive disk 176. The actuator arm 174 is pivotally coupled to a piston 178 of the hydraulic cylinder 172 at one end and to the drive disk 176 at another end. Extension and retraction of the piston 178 drives the actuator arm 174 to rotate the drive disk 176 clockwise or counterclockwise. A pin drive 179 connects each locking pin 160 to the disk 176 and translates rotational motion of the drive disk 176 to linear motion of the locking pin 160. The cylinder 172 is a double acting hydraulic cylinder that is locked in position in the absence of hydraulic fluid flow to or from the cylinder. This negates the need to continuously pressurize the cylinder 172 with attendant risk of leaks and also reduces the system pressure necessary to operate the machine as a whole. As mentioned briefly above, cylinder operation may be controlled, for example, by one or more buttons on a joystick, by functionality on the touchscreen described above, or by any other suitable control(s) designated by the "CUTTER DRUM CONNECT/DISCONNECT 220" box in FIG. 19. Referring to FIG. 15, each pin drive 179 comprises a housing 180 having an axial bore 182 receiving the locking pin 160. The locking pin 160 has an outer end 184 and an inner end 186. A link 188 is pivotally connected to the inner end 186 of the locking pin 160 at one end and to the drive disk 176 at the other, inner end. A biasing device, in this case a Belleville washer assembly 190, is provided in the housing 180 for biasing the locking pin 160 toward the mounting pin 154 to a position in which the outer end 184 is received in the bore 156 in the mounting pin 154.

Figure 14:
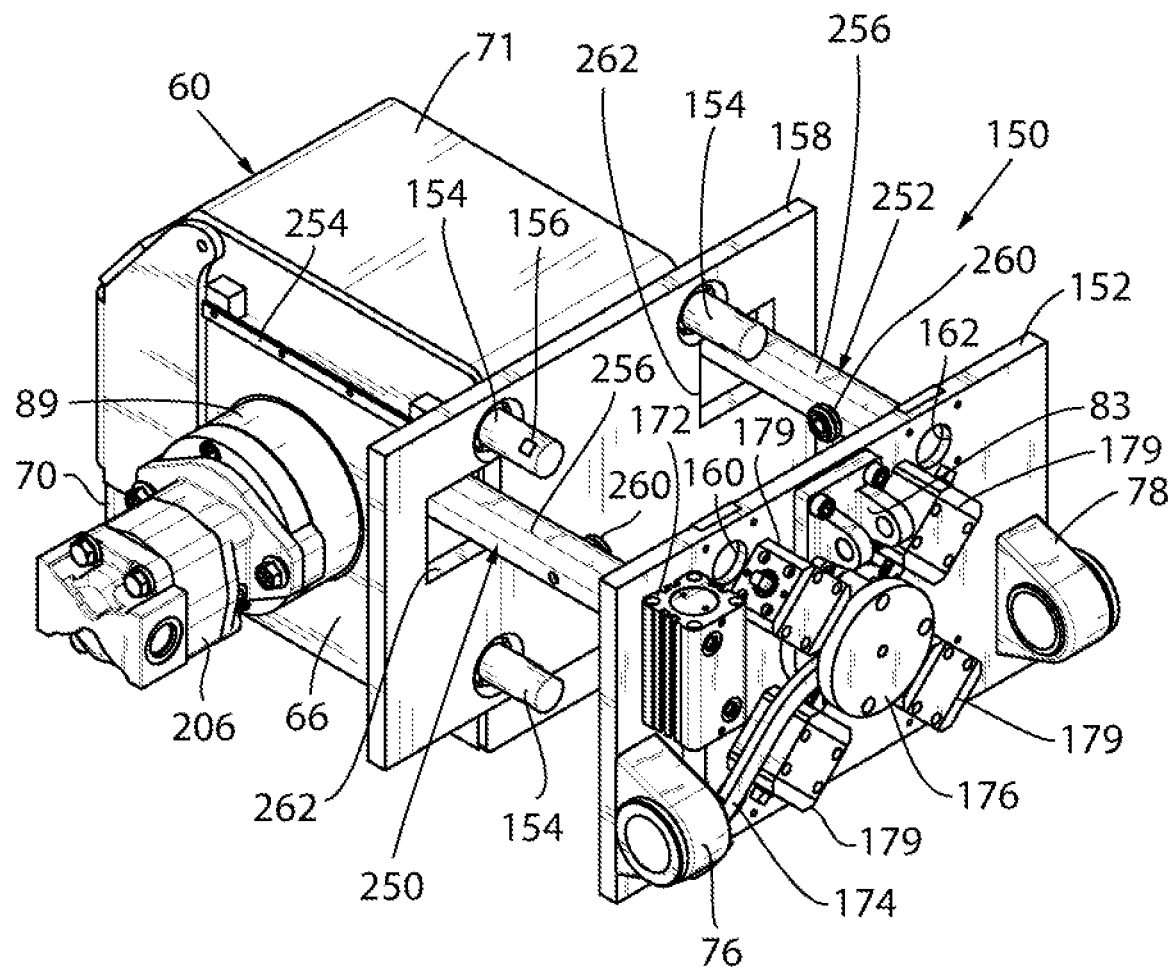
FIG. 14 is an isometric view of the quick connect coupling of FIGS. 11-13, showing the coupling in a partially-disengaged position.

Referring to FIGS. 11-14, the quick connect coupling 150 additionally includes guides that are selectively engageable upon movement of the support plate 152 toward the cutter wheel support plate 158 to guide the mounting pins 154 into and through the holes 162 in the support plate 152. Two guides 250, 252 are located on opposite sides of the quick connect coupling 150. They are mirror images of each other. Each guide 250 or 252 comprises a rail 254 mounted on a side plate 64 or 66 of the cutter housing 60, and an arm 256 extending forwardly from the front surface of the support plate 152. Each arm 256 supports a pair of longitudinally-spaced v-rollers 258, 260. Each arm 256 is alignable with a corresponding opening 262 in the cutter wheel support plate 158 as seen in FIG. 14.

The plates 152 and 158 also could be provided with quick-connect hydraulic couplings connecting supply and return lines to the cutting drum drive motor 206. They also could be fitted with a hose connection for directing dust from the cutter drum to the inlet tube 132 of the dust handling system 42.

The illustrated quick connect coupling is just one of many that could be used to quick attach and detach the cutter 22 or other implement to or from the machine 20.

To mount an implement, in this case the cutter drum 22, to the machine 20, the machine is simply driven toward the implement with the implement resting on the ground and the arms 256 of each guide 250, 252 generally aligned with the corresponding rail 254. During this motion, the arms 256 progressively extend through the openings 262 as seen in FIG. 14 so that the rollers 258 and 260 on each arm 256 are positioned beneath the rail 214, and so that the mounting pins 154 extend through the holes 162 in the support plate 152 toward the position shown in FIGS. 11 and 12. The lift cylinder 208 is then actuated to tilt the cutter drum 22, during which motion the rollers 258 and 260 on each guide 250 or 252 engage the bottom of the corresponding rail 254. The rails 254 then ride along the rollers 258 and 260 so that the plate 158 moves to a position in which it is coplanar with and abuts against the plate 152, and the locking pins 160 are aligned with the bores 156 in the mounting pins 154. The hydraulic cylinder 172 is then actuated to rotate the drive disk 176 to drive the locking pins 160 into engagement with the bores 156 of the mounting pins 154, locking the cutter drum 22 in place.

The implement can be detached from the machine 20 by reversing the above-described sequence. Hence, the cylinder 208 is actuated to lower the cutter head 22 to the ground, and the cylinder 172 is retracted to rotate the drive disk 176 in the opposite direction as described above. Each locking pin 160 disengages from the corresponding bore 162 in the support plate 152. The machine 20 can simply be backed away from the implement with the arms 256 of guides 250 and 252 withdrawing from the openings 262 in the plate 158 and with the support pins 154 withdrawing from the holes 162 in the support plate 152.

Figure 16:
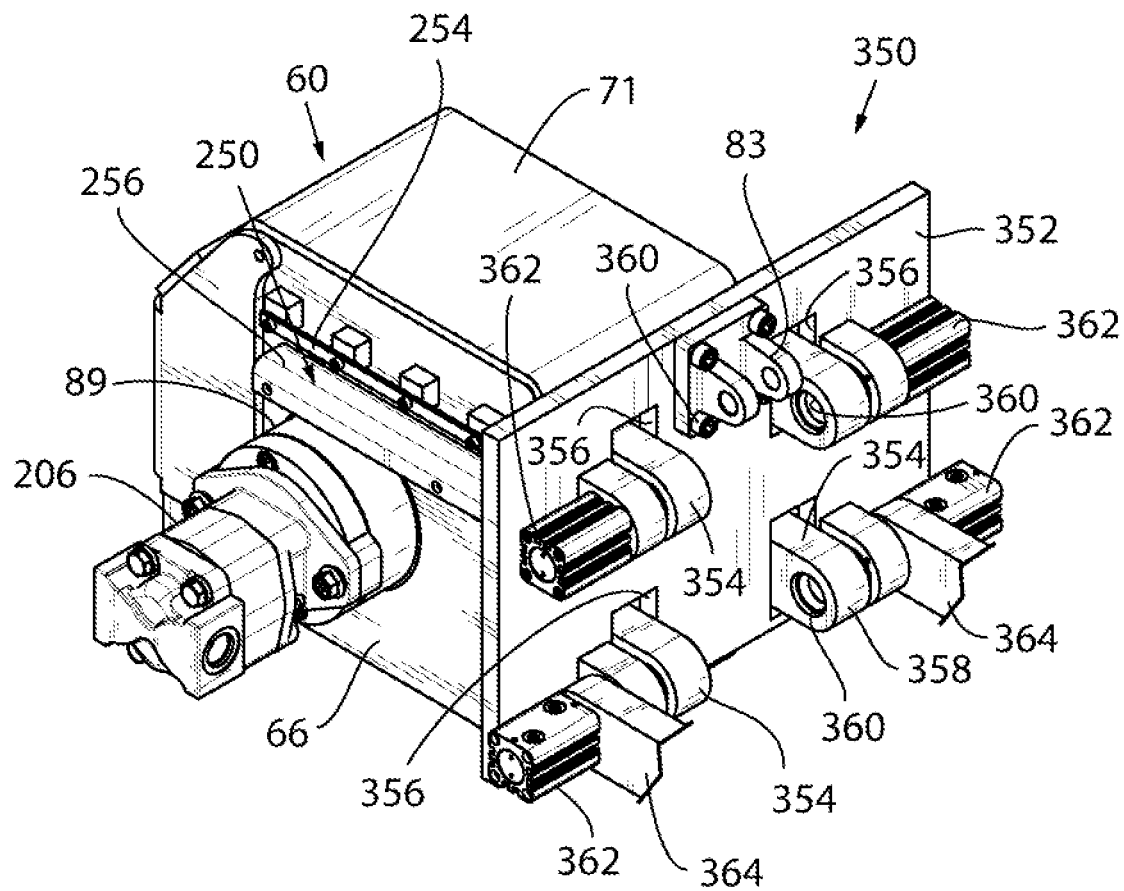
FIG. 16 is an isometric view of another quick connect coupling of the roadway maintenance machine of FIGS. 1-5, showing the coupling in its fully-engaged position.
Figure 17:
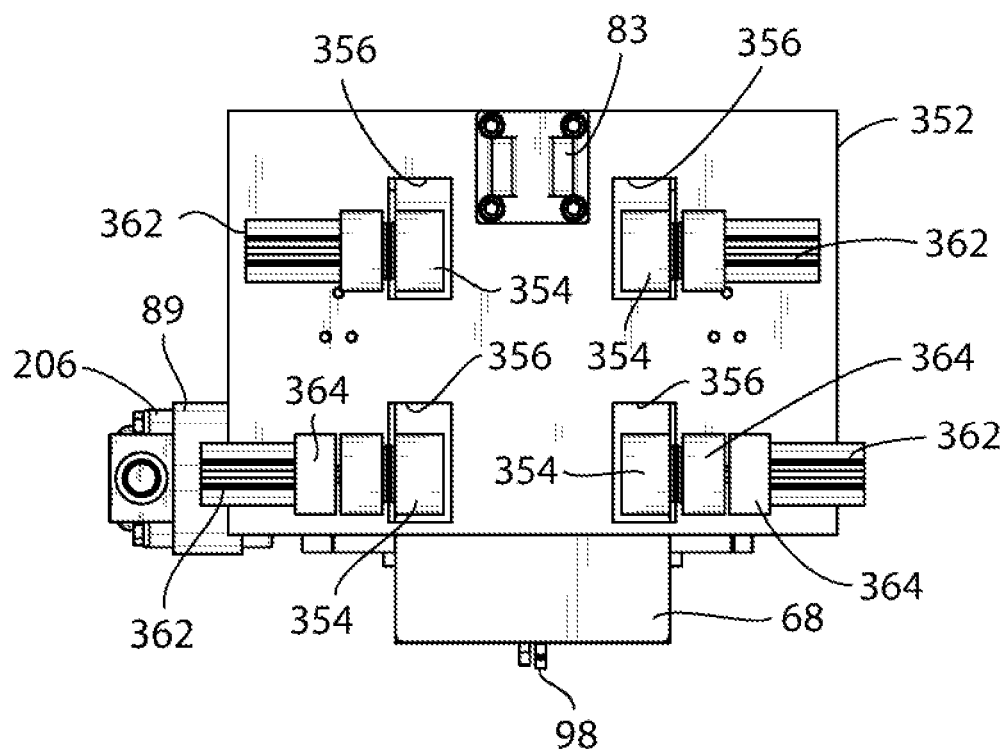
FIG. 17 is a rear elevation view of the quick connect coupling of FIG. 16.
Figure 18:
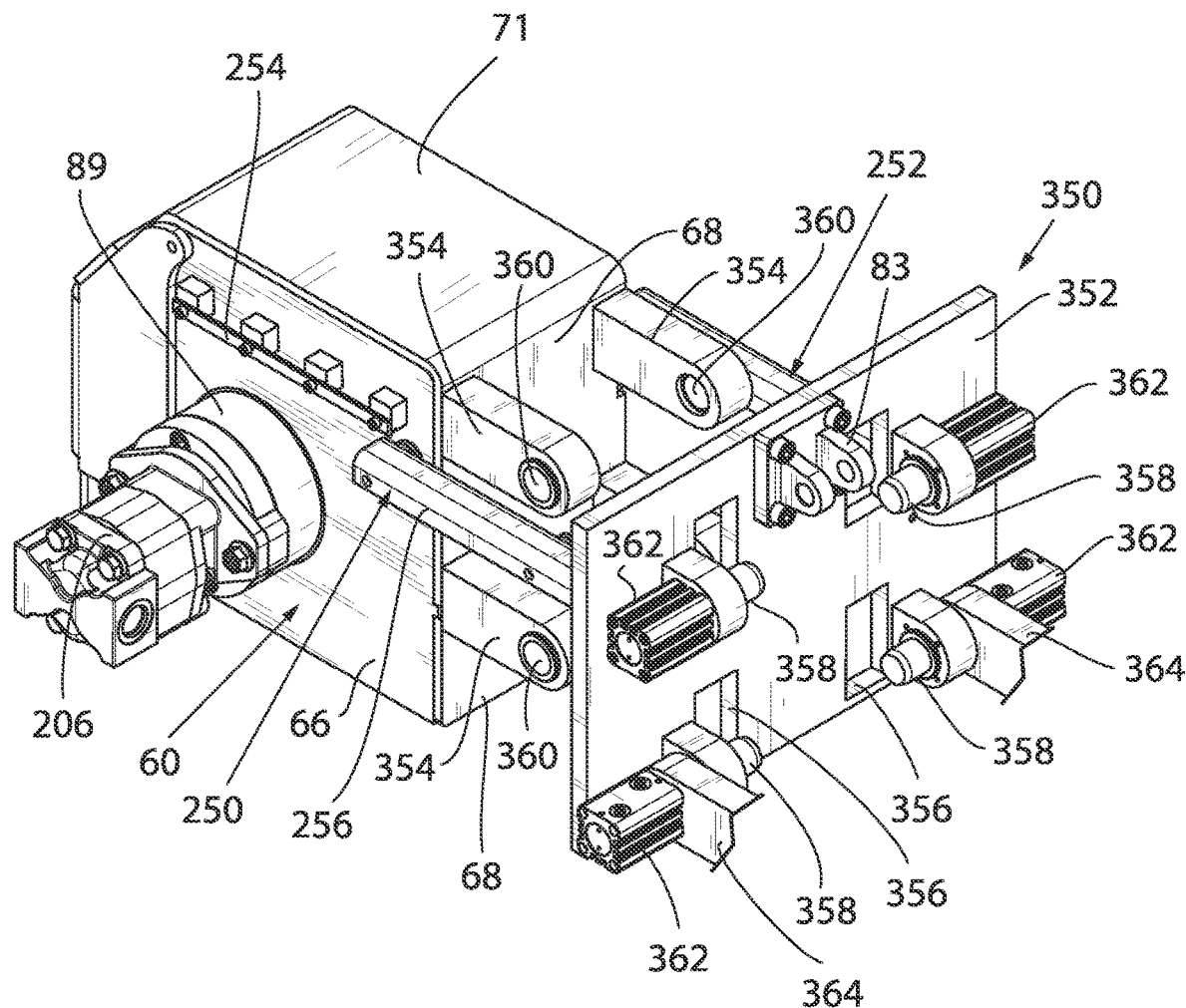
FIG. 18 is an isometric view of the quick connect coupling of FIGS. 15 and 16, showing the coupling in a partially-disengaged position.

The quick connect coupling 150 is just one of many that could be used to quick attach and detach the cutter 22 or other implement to or from the machine 20. Another example is shown in FIGS. 16-18 at 350. Quick connect coupling 350 is characterized by a rear support plate 352 engageable directly with bosses 354 that are mounted on the rear t plate 68 of the cutter housing 60 and that selectively engage corresponding holes 356 in the support plate 352. Four bosses 354 are provided, one near each corner of the rear plate 68 of the cutter housing 60. Referring to FIGS. 16 and 17, when the quick connect coupling 350 is engaged, cutter housing 60 is locked from moving relative to the plate 352 by the engagement of locking pins 358 in bores 360 of the bosses 354. The locking pins 358 can be driven into and out of engagement with the bores 360 by an actuator. In the illustrated embodiment, the actuator comprises four double acting cylinders 362, each of which is associated with a respective locking pin 358. Each locking pin 358 is attached to the end of or formed by the piston of an associated cylinder 362. Extension and retraction of the piston of each cylinder 362 drives the associated locking pin 358 horizontally into and out of the bore 360 in the associated boss 354. As with the cylinder 172 of the quick connect coupling, cylinder operation can be controlled, for example, by one or more buttons on a joystick, by functionality on the touchscreen described above, or by any other suitable control(s) designated by the "CUTTER DRUM CONNECT/DISCONNECT 220" box in FIG. 19. The plate 352 also bears the mounting bracket 83 for the lift cylinder 208 and pivot links 364 for connection to the main frame or chassis 24 of the machine 20 to permit raising and lowering of the cutter drum 22 as described above.

Still referring to FIGS. 16-18, the quick connect coupling 350 additionally includes the same guides 250 and 252 employed by the quick connect coupling 150 of the first embodiment. Each guide 250, 252 thus includes a rail 254 mounted on a side plate 64 or 66 of the cutter housing 60, and an arm 256 extending forwardly from the front surface of the support plate 352. Each arm 256 supports a pair of longitudinally-spaced v-rollers 258, 260. As with the first embodiment, the quick connect coupling 350 also could be provided with quick-connect hydraulic couplings connecting supply and return lines to the cutting drum drive motor 206. They also could be fitted with a hose connection for directing dust from the cutter drum to the inlet tube 132 of the dust handling system 42.

To mount an implement, in this case the cutter drum 22, to the machine 20, the machine is simply driven toward the implement with the implement resting on the ground and the arm 256 of each guide 250, 252 generally aligned with the corresponding rail 254. The bosses 354 pass through the openings 356 in plate 352 during this motion. The lift cylinder 208 is then actuated to tilt the cutter drum 22, during which motion the rollers 258 and 260 on each guide 250 or 252 engage the bottom of the corresponding rail 254. The rails 254 then ride along the rollers 258 and 260 so that the cutter housing rear plate 68 is coplanar with and abuts against the plate 352, and the looking pins 358 are aligned with the bores 360 in the bosses 354. The hydraulic cylinders 362 are then actuated to drive the pins 358 into the bores 360 of the bosses 354.

The implement can be detached from the machine 20 by reversing the above-described sequence. Hence, each cylinder 362 is simply retracted to disengage the associated locking pin 358 from the corresponding bore 360, and the cylinder 208 can be actuated to lower the cutter drum 22 onto the ground. The machine 20 can simply be backed away from the implement to y withdraw the bosses 354 from the holes 356 in the support plate 352.

Operation of the machine 20 now will be described.

The cutter drum 22 is first mounted on the machine 20 using the quick connect coupling 150 of FIGS. 11-15. The cutter lift cylinder 208 is then actuated to fully raise the cutter drum 22 relative to the chassis 24, and the seated operator drives the machine 20 to the vicinity of the crack such as by using one joystick 51 to control vehicle speed and another joystick 53 to steer the vehicle. Maximum vehicle speed, obtainable at full fore or aft joystick stroke, may be on the order of 5-12 mph. The machine 20 may be configured to permit this high speed travel only when the cutter drum 22 is raised. The operator then actuates the cylinder 208 using the control 212 of FIG. 19 to lower the cutter drum 22 into its operative position in which the lowermost cutter wheel 98 engages roadway surface and the disks 90 and 92 flank the crack. The cutter assembly 62 is driven to rotate by its dedicated hydraulic motor 206 during or just prior to cutter drum lowering so that the cutter wheel assemblies 94 revolve about the center axis of the drum 86 with the cutter wheels 98 free-wheeling about the pins 96 as they engage the ground, routing the crack. Drum rotational speed may vary from application-to-application and with designer preference. It also may be fixed or user-settable. In the illustrated embodiment, drum rotational speed is fixed at about 1500 RPM to 2500 RPM and, more typically, of about 2100 RPM. The lowering process may be a two-step process, in which the cutter drum 22 is first lowered into proximity with but still above the roadway surface, and the operator moves the machine as necessary to better align the cutter drum with the crack to lower the cutter assembly 62 into contact with the roadway surface. The roadway surface is then cut to form a trench that eliminates the crack. That trench typically will be on the order of 0.25" to 2.5" wide to 0.25 to 2.5" deep. The cutter assembly 62 rotates in a direction such that debris ejected by drum travel rearwardly toward the dust handling system 42 rather than forwardly. The cover 71 assures that dust and debris generated during the cutting process remain confined to the work zone until collected by the dust handling system 42.

The operator then steers and propels the machine 20 along the crack using direct line of sight to the cutter drum to precisely align the cutter drum 22 with the crack. The controller 200 of FIG. 19 may be responsive to lowering of the cutter drum 22 to its operative position to limit the maximum vehicle speed during the routing operation to be substantially less than that which is possible when traveling from site to site. This maximum "routing speed" may be on the order of 20-100 feet/minute or, more typically, of about 90 feet/minute. The maximum routing speed may be dependent on prevailing cutting depth and/or cutting width. It is also possible that the routing speed can be independent of joystick stroke from neutral so that the routing speed is always optimized for the prevailing cutting width and depth.

In one possible implementation, the machine 20 will automatically stop upon triggering of a cutter drum lowering command 212, with speed control changing over between rapid "site-to-site" propulsion to slower "routing" propulsion during the brief period that the machine 20 is stopped and the cutter drum 22 is being lowered to its operative position.

The cutter wheel assemblies 94 cut a trench in the crack of a width that is determined by the width of each cutter wheel 98 (typically ⅜") and by the placement of the cutter wheel 98 of each assembly 94 on its respective pin 96. The trench is cut to a depth that may be either predesignated or controlled by the operator. In either event, cutting depth may monitored by any suitable device 216 (FIG. 19) that monitors the vertical spacing between the road surface and the chassis or the subframe. One suitable device is a spring-mounted wheel that rides along the road surface adjacent the cutter drum 22. The controller 200 may use the resultant signals as feedback to extend or retract the cylinder 208 as needed to maintain cutting depth uniform throughout the routing operation. Alternatively, the cutting depth control may be open-loop and set by extending the hydraulic cylinder 208 by an amount that is predetermined to obtain the desired cutting depth. In this case, no monitor is required.

Dust generated during this routing operation is removed by the dust handling system 42 and, ultimately, ejected from the rear outlet tube 132 for bagging or other handling.

Precise roadway crack routing is facilitated during this operation by the fact that the operator faces forwardly with a clear line of sight to the work area consisting of the cutter drum and the crack. Operation is further facilitated by the provision of intuitive controls that an operator can readily access without taking his or her eyes off the work area. Built-in speed controls, or at least speed limiting, during a routing operation takes additional guesswork out of the routing operation. Cutting depth is precisely controlled in either an open loop or closed loop fashion without the requirement for ongoing operator input.

Many changes and modifications could be made to the invention without departing from the spirit thereof.

We claim:

1. A roadway maintenance machine comprising:
a chassis having front and rear portions disposed fore and aft of a lateral centerline, respectively;
wheels that support the chassis on a roadway, the wheels including first and second laterally spaced non-steerable front wheels that each rotates about a horizontal axis that extends laterally of the machine and a rear wheel disposed laterally between the front wheels, the rear wheel being turnable about a vertical axis to steer the machine
an engine mounted on the chassis;
an operator's station located on the front portion of the chassis and including a forward-facing operator's seat; and
a routing cutter drum, mounted on the front portion of the chassis, for performing roadway crack routing operations as the machine is propelled forwardly along the roadway, the cutter drum including a rotating cutter assembly that rotates about a horizontal cutter assembly axis that extends laterally of the machine.

2. The roadway maintenance machine as recited in claim 1, wherein the operator's station further comprises one or more operator-actuated controls for controlling the machine.

3. The roadway maintenance machine as recited in claim 2, wherein the controls include first and second joysticks, one of which is configured to control forward and reverse propulsion of the machine and one of which is configured to steer the machine.

4. The roadway maintenance machine as recited in claim 1, further comprising a quick-connect coupling via which the cutter drum is removably mounted on the chassis.

5. The roadway maintenance machine as recited in claim 4, wherein the quick-connect coupling comprises mounting pins located on one of the cutter drum and the chassis, locking pins on the other of the cutter drum and the chassis, and at least one actuator configured to selectively drive the locking pins into and out of engagement with the mounting pins.

6. The roadway maintenance machine as recited in claim 5, wherein the actuator comprises a hydraulic cylinder and a crank assembly coupling the hydraulic cylinder to the locking pins.

7. The roadway maintenance machine as recited in claim 5, wherein the quick connect coupling comprises a plurality of mounting bosses located on one of the cutter drum and the chasses, a corresponding plurality of pins located on the other of the cutter drum and the chassis, and a plurality of actuators that are configured to drive the pins into and out of engagement with mating bores in the bosses.

8. The roadway maintenance machine as recited in claim 7, wherein the quick-connect coupling further comprises a guide assembly including a pair of spaced guide arms that are configured to cause the pins to move into alignment with the bores in the bosses as the machine is moved toward the cutter drum.

9. The roadway maintenance machine as recited in claim 1, wherein the cutter assembly includes first and second disks that are rotatable about the cutter assembly axis and a plurality of peripherally spaced cutter wheel assemblies, each of which is mounted between the disks and supports at least one cutter wheel that is configured to rotate about an axis that is parallel with but radially offset from the cutter assembly axis.

10. The roadway maintenance machine of claim 9, wherein each cutter wheel assembly includes a pin and first and second bushings that support the pin and that are removably inserted into respective bores in the first and second disks, and further comprising first and second retainers that releasably retain the first and second bushings in the respective bores of the first and second disks.

11. The roadway maintenance machine as recited in claim 9, wherein each cutter wheel assembly comprises a pin extending between the first and second disks, a cutter wheel mounted on the pin in a free-wheeling manner, at least one spacer mounted on the pin between the cutter wheel and one of the disks, and a sacrificial washer surrounding the pin and attached to an inner axial surface of each of the first and second disks.

12. The roadway maintenance machine as recited in claim 1, further comprising an actuator that raises and lowers the cutter drum relative to the chassis and that, during a cutting operation maintains a uniform cutting depth.

13. A roadway maintenance machine comprising:
a chassis having front and rear portions disposed fore and aft of a lateral centerline, respectively;
wheels that support the chassis on a roadway and that include at least one wheel that can be driven and/or steered;
an engine mounted on the chassis;
an operator's station located on the front portion of the chassis and including a forward-facing operator's seat;
a crack router cutter drum, mounted on the front portion of the chassis at a location positioned at least in part behind a front end of the operator's seat, for performing a roadway crack routing operation, the cutter drum comprising a driven shaft, first and second disks that are mounted on the driven shaft so as to be rotatable with the driven shaft about a common axis, and a plurality of peripherally spaced cutter wheel assemblies, each of which includes a pin that extends between the disks and a cutter wheel that is mounted on the pin and that is rotatable about an axis that is parallel with but radially offset from the rotational axis of the disks, wherein the location at which the cutter drum is positioned provides an unobstructed line of sight from an operator to the cutter drum when the operator is sitting on the operator's seat and facing forwardly;
a hydraulic drive motor that is configured to drive the driven shaft to rotate;
a hydraulic actuator that is configured to raise and lower the cutter drum relative to the chassis; and
controls, accessible by a seated operator, that are configured to steer and propel the machine and to control operation of the cutter drum including cutter drum rotation and raising and lowering of the cutter drum.

14. The roadway maintenance machine as recited in claim 13, wherein each cutter wheel assembly further comprises at least one spacer mounted on the pin between the cutter wheel and one of the disks, and a sacrificial washer surrounding the pin and attached to an inner axial surface of each of the first and second disks.

15. The roadway maintenance machine as recited claim 13, further comprising a quick-connect coupling via which the cutter drum is removably mounted on the chassis, wherein the quick connect coupling comprises a plurality of mounting bosses located on one of the cutter drum and the chasses, a corresponding plurality of pins located on the other of the cutter drum and the chassis, and a plurality of actuator assemblies that are configured to drive the pins into and out of engagement with mating bores in the bosses.

16. The roadway maintenance machine as recited in claim 13, further comprising first and second footrests that flank the cutter drum with a portion of the cutter drum being located behind the footrests.

17. A roadway maintenance machine comprising:
a chassis having front and rear portions disposed fore and aft of a lateral centerline, respectively;
wheels that support the chassis on a roadway and that include at least one wheel that can be driven and/or steered;
an engine mounted on the chassis;
an operator's station located on the front portion of the chassis and including a forward-facing operator's seat;
a crack router cutter drum, mounted on the front portion of the chassis at a location which is positioned at least in part behind a front end of the operator's seat, for performing a roadway crack routing operation, the cutter drum comprising a driven shaft, first and second disks that are mounted on the driven shaft so as to be rotatable with the driven shaft about a common axis with the rotatable shaft, and a plurality of peripherally spaced cutter wheel assemblies, each of which includes a pin that extends between the disks and a cutter wheel that is mounted on the pin so as to be rotatable about an axis that is parallel with but radially offset from the rotational axis of the disks;
a hydraulic drive motor that is configured to drive the driven shaft to rotate;
a hydraulic actuator that is configured to raise and lower the cutter drum relative to the chassis; and
controls, accessible by a seated operator, that are configured to steer and propel the machine and to control operation of the cutter drum including cutter drum rotation and raising and lowering of the cutter drum, wherein each cutter wheel assembly further comprises
first and second bushings that support the pin and that are removably inserted into respective bores in the first and second disks, and
first and second retainers that releasably retain the first and second bushings in the respective bores of the first and second disks.

18. The roadway maintenance machine as recited in claim 17, further comprising first and second sleeves, each of which is inserted in a respective one of the first and second bores in the first and second disks, and wherein each bushing includes an inner end of a first diameter and an outer end of a second diameter that is greater than the first diameter, the inner end being inserted into one of the sleeves, and the outer end being removably held in the sleeve by one of the retainers.

* * * * *